US010518666B2

(12) United States Patent
Hagan et al.

(10) Patent No.: US 10,518,666 B2
(45) Date of Patent: Dec. 31, 2019

(54) LINEAR MOTION ASSEMBLIES AND BEARINGS FOR USE IN LINEAR MOTION ASSEMBLIES

(71) Applicant: SAINT-GOBAIN PERFORMANCE PLASTICS PAMPUS GMBH, Willich (DE)

(72) Inventors: Timothy J. Hagan, Succasunna, NJ (US); Jens Speicher, Willich (DE); Lukas Plioska, Nettetal (DE); Alexander Jindra, Juchen (DE); Abe Sanchez, Dover, NJ (US); Chloe Echikson, Northfield, NJ (US)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 0 days.

(21) Appl. No.: 14/882,676

(22) Filed: Oct. 14, 2015

(65) Prior Publication Data
US 2016/0101712 A1    Apr. 14, 2016

Related U.S. Application Data

(60) Provisional application No. 62/063,718, filed on Oct. 14, 2014, provisional application No. 62/072,851, filed on Oct. 30, 2014.

(51) Int. Cl.
*B60N 2/07*    (2006.01)
(52) U.S. Cl.
CPC ................... *B60N 2/0722* (2013.01)
(58) Field of Classification Search
CPC .. B60N 2/0722; B60N 2/0705; B60N 2/0715; B60N 2/07; B60N 2/08; B60N 2205/20

USPC ....... 248/419, 421, 423, 425, 429, 430, 500, 248/503.1; 296/65.13, 65.14
See application file for complete search history.

(56) References Cited

U.S. PATENT DOCUMENTS

| | | | | |
|---|---|---|---|---|
| 2,970,015 | A | * | 1/1961 | Ragsdale ............. B60N 2/0705 384/47 |
| 3,545,716 | A | * | 12/1970 | Colautti ................. B60N 2/067 248/430 |
| 3,601,459 | A | | 8/1971 | Cutting et al. |
| 3,729,239 | A | * | 4/1973 | Camosso ................ F16C 19/44 384/575 |

(Continued)

FOREIGN PATENT DOCUMENTS

AU    728577 B2    1/2001
EP    0394892 A2    10/1990
(Continued)

OTHER PUBLICATIONS

International Search Report from International Application No. PCT/EP2015/073769, dated Jan. 22, 2016, 1 page.

*Primary Examiner* — Muhammad Ijaz
(74) *Attorney, Agent, or Firm* — Abel Schillinger, LLP; Chi Suk Kim

(57) ABSTRACT

A seat track assembly including a first rail and a second rail spaced apart by a distance and extending parallel with respect to one another, wherein at least one of the first and second rails having a first receiver, a second receiver, the first and second receivers longitudinally translatable with respect to each other, and a sliding member disposed therebetween, wherein the sliding member defines an aperture extending at least partially therethrough.

16 Claims, 10 Drawing Sheets

(56) References Cited

U.S. PATENT DOCUMENTS

| | | | | |
|---|---|---|---|---|
| 3,930,632 | A | 1/1976 | Shigeta et al. | |
| 4,168,051 | A | 9/1979 | Terada | |
| 4,183,689 | A * | 1/1980 | Wirges | A47C 3/30 108/147 |
| 4,291,856 | A | 9/1981 | Urai | |
| 4,395,011 | A | 7/1983 | Torta | |
| 4,478,383 | A | 10/1984 | Urai | |
| 4,483,504 | A | 11/1984 | Duwelshoft | |
| 4,511,187 | A * | 4/1985 | Rees | B60N 2/0705 248/430 |
| 4,588,234 | A * | 5/1986 | Rees | B60N 2/0705 384/47 |
| 4,730,804 | A | 3/1988 | Higuchi et al. | |
| 4,906,109 | A | 3/1990 | Balsells | |
| 4,958,799 | A | 9/1990 | Clauw et al. | |
| 5,018,696 | A | 5/1991 | Siegrist | |
| 5,046,698 | A * | 9/1991 | Venier | B60N 2/071 248/429 |
| 5,213,300 | A | 5/1993 | Rees | |
| 5,301,914 | A | 4/1994 | Yoshida et al. | |
| 5,445,354 | A | 8/1995 | Gauger et al. | |
| 5,582,381 | A * | 12/1996 | Graf | B60N 2/071 248/430 |
| 5,643,174 | A | 7/1997 | Yamamoto et al. | |
| 5,826,936 | A | 10/1998 | Scordato et al. | |
| 5,921,606 | A * | 7/1999 | Moradell | B60N 2/01541 248/429 |
| 6,102,379 | A | 8/2000 | Ponslet et al. | |
| 6,105,921 | A | 8/2000 | Carrig et al. | |
| 6,264,159 | B1 | 7/2001 | Su | |
| 6,494,312 | B2 * | 12/2002 | Costanzo | B65G 17/08 198/779 |
| 6,578,810 | B2 | 6/2003 | Eguchi et al. | |
| 6,860,538 | B2 | 3/2005 | Mueller et al. | |
| 8,632,043 | B2 | 1/2014 | Dahlbacka et al. | |
| 8,646,742 | B2 * | 2/2014 | Hayashi | B60N 2/0707 248/419 |
| 8,708,410 | B2 | 4/2014 | Scott et al. | |
| 9,027,899 | B2 * | 5/2015 | Haller | B60N 2/0705 248/424 |
| 2001/0006209 | A1 * | 7/2001 | Yoshida | B60N 2/071 248/429 |
| 2001/0013570 | A1 | 8/2001 | Yoshida et al. | |
| 2002/0050112 | A1 * | 5/2002 | Koch | A47B 9/20 52/651.07 |
| 2002/0056798 | A1 * | 5/2002 | Eguchi | B60N 2/01591 248/429 |
| 2002/0084683 | A1 | 7/2002 | Christopher | |
| 2002/0130238 | A1 * | 9/2002 | Downey | B60N 2/0705 248/430 |
| 2004/0089785 | A1 | 5/2004 | McCullen et al. | |
| 2006/0217984 | A1 | 9/2006 | Lindemann | |
| 2007/0210232 | A1 * | 9/2007 | Kropfreiter | B60N 2/067 248/429 |
| 2011/0284704 | A1 * | 11/2011 | Pryor | A47B 9/14 248/188.5 |
| 2013/0110087 | A1 * | 5/2013 | Kane | A61M 25/00 604/543 |

FOREIGN PATENT DOCUMENTS

| | | |
|---|---|---|
| EP | 1116624 A2 | 7/2001 |
| EP | 1116623 A2 | 7/2011 |
| GB | 1362040 A | 7/1974 |
| GB | 2419854 A | 5/2006 |
| JP | 2002096661 A1 | 2/2002 |
| WO | 0035705 A1 | 6/2000 |

* cited by examiner

LINEAR MOTION ASSEMBLIES AND BEARINGS FOR USE IN LINEAR MOTION ASSEMBLIES

CROSS-REFERENCE TO RELATED APPLICATION(S)

This application claims priority under 35 U.S.C. § 119(e) to U.S. Provisional Patent Application No. 62/063,718, filed Oct. 14, 2014, entitled "ADJUSTABLE SEAT TRACK ASSEMBLY," by Timothy J. Hagan, et al., and claims priority under 35 U.S.C. § 119(e) to U.S. Provisional Patent Application No. 62/072,851, filed Oct. 30, 2014, entitled "ADJUSTABLE SEAT TRACK ASSEMBLY," by Timothy J. Hagan, et al., which applications are incorporated by reference herein in their entirety.

FIELD OF THE DISCLOSURE

The present disclosure relates to linear motion assemblies, and more particularly to bearings for use in linear motion assemblies.

RELATED ART

Linear motion assemblies generally include multiple components translating longitudinally with respect to one another. One or more sliding members can facilitate translation. The sliding members typically include ball bearings and caged ball bearings formed of hardened-steel. Paints, coatings, finishes, and lubricants, such as grease, may be coated on the ball bearings to reduce frictional coefficients and facilitate sliding. These materials can leak or peel during installation and use, contaminating the assembly, grinding against the components during translation, and introducing a carrier for particulate, such as dust and debris.

Burnishing is a well known problem associated with the use of ball bearings. To accommodate for the known effects associated with burnishing, assemblies typically undergo a break in period where the components are repeatedly cycled between foremost and rearmost positions. During this time both the components and ball bearings undergo a transformation until equilibrium is reached and burnishing is complete. Outer coatings, paints, lubricants, and other finishes are typically stripped from the ball bearings and components during this time and can collect within the site. This may accelerate fatigue and significantly reduce operable lifespan of the assembly.

No proposed solution has been successful at replacing ball bearings in various linear motion assemblies because of the high costs associated with other options and high structural forces imparted to particular assemblies. Use of linear motion assemblies without ball bearings have been generally unsuccessful and not been commercially accepted, for example, in seat track assemblies, high temperature assemblies.

Therefore, a need exists for a linear motion assembly, such as an adjustable seat track assembly, capable of avoiding the known problems associated with the use of ball bearings while maintaining sufficient structural strength and tolerance compensation properties as now demanded by the industry.

BRIEF DESCRIPTION OF THE DRAWINGS

Embodiments are illustrated by way of example and are not intended to be limited in the accompanying figures.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the linear motion arts.

Figure 17:
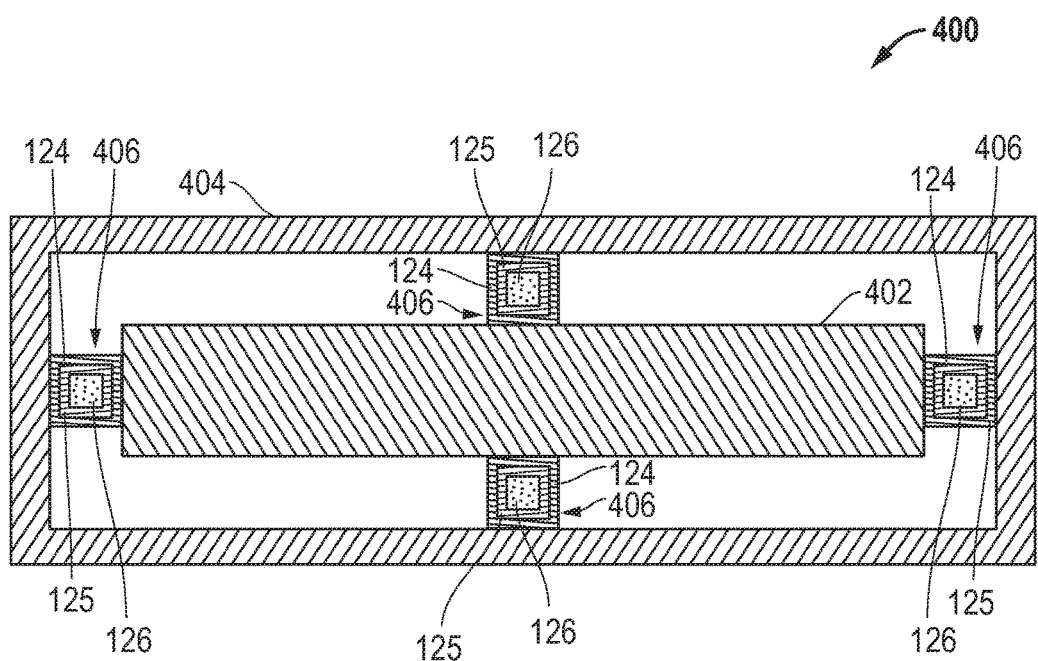
FIG. 17 includes a cross-sectional elevation view of a linear motion assembly in accordance with an embodiment.

FIG. 17 illustrates a cross-sectional elevation view of a linear motion assembly 400 including a first component 402, a second component 404, and sliding members 406 disposed between the first and second components 402 and 404. Linear motion between the first and second components 402 and 404 may occur in a direction generally into and out of the page. In certain applications, rotational motion can additionally occur in a clockwise or counterclockwise manner.

As will be described in accordance with a particular aspect, the sliding members 406 may include elongated tubes. The elongated tubes can each include a body consisting of, consisting essentially of, or comprising a low friction material. An aperture can extend through at least one of the elongated tubes and define an inner surface of the sliding member. A spring or other similar support feature may be disposed within the aperture. In an embodiment, the spring may be readily separable from the body. In other embodiments, the body may define a plurality of apertures each extending at least partially through the elongated tube. The presence of one or more apertures within the body of the elongated tube may promote tolerance absorption.

In another aspect, the sliding member can include a substrate having an elongated shape and a low friction material disposed around the substrate. The low friction material can include a sheet of material rolled around the substrate. In an embodiment, a gap can extend along the axial length of the sliding member. In another embodiment, at least one of the axial ends of the substrate may be exposed from the low friction material. In a further embodiment, a void may be disposed between a portion of the substrate and the low friction material. The void may permit tolerance absorption through deformation of the low friction material.

Figure 1:
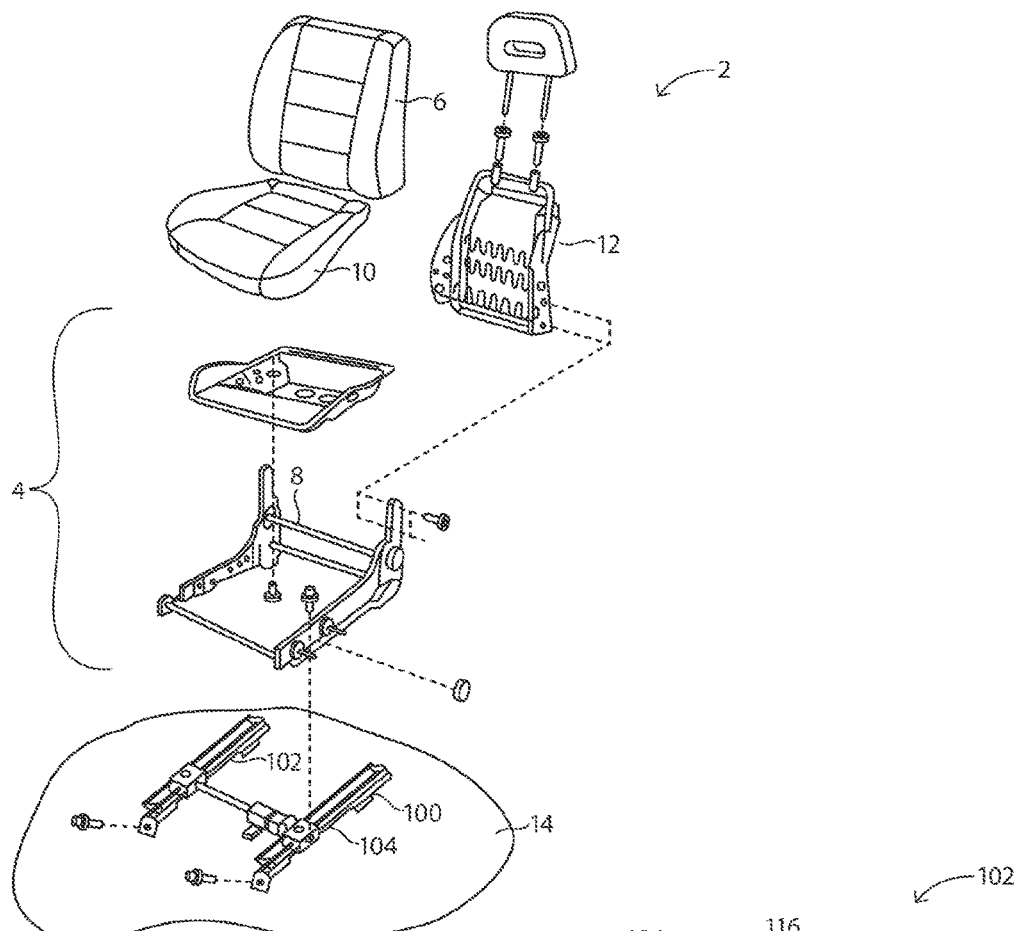
FIG. 1 includes an exploded perspective view of an exemplary seat assembly.

Skilled artisans will recognize that while the description below is directed to seat track assemblies, the disclosure is not intended to be limited to seat track assemblies, and can also include other linear motion assemblies such as, for example, seat cushion depth adjustment assemblies, seat length adjustment assemblies, seat back adjustment assemblies, adjustable sliding console, sun and moon roof sliding mechanisms, window height adjustment systems, sliding doors, telescoping assemblies such as steering systems, slidable racks and brackets such as found in dishwashers and oven racks, sliding drawers and cabinets, sliding surfaces, linear actuators, motors, gears, office components such as printers, fax machines, scanners, copiers, and components performing a plurality of such operations, assembly processes, automated machines and assemblies, or any other similar component or assembly which incorporates linear motion exhibited between two or more components. Skilled artisans will further recognize that while the disclosure is directed to linear motion assemblies, certain applications require rotational flexibility, where the sliding member provides a low friction surface for both linear and rotational translations Referring to FIG. 1, a seat assembly 2 generally includes a seat having a bottom portion 4 and a seat back 6. The seat back 6 may be pivotally connected with the bottom portion 4. The bottom portion 4 may include a frame 8, a cover 10, and a cushion or support disposed therebetween. The seat back 6 may include an internal support 12. The seat assembly 2 may provide a location whereby a vehicle passenger may sit.

A seat track assembly 100 may be coupled to the seat assembly 2 along the bottom portion 4. In specific embodiments, the seat track assembly 100 may attach to the frame 8 and can be secured thereto by a threaded or nonthreaded fastener, or other suitable attachment method. Alternatively, an intermediary member may be disposed between the seat track assembly 100 and the frame 8. The intermediary member may include one or more adjustment features or controls which permit adjustability and repositioning of the seat assembly 2. The seat track assembly 100 may attach to a surface (e.g., a floor 14) of a vehicle, securing the seat assembly 2 thereto.

The seat track assembly 100 can generally include two spaced apart rails 102 and 104 disposed in parallel orientation with respect to one another. The rails 102 and 104 may extend between the front and back of the seat assembly 2.

Figure 2:
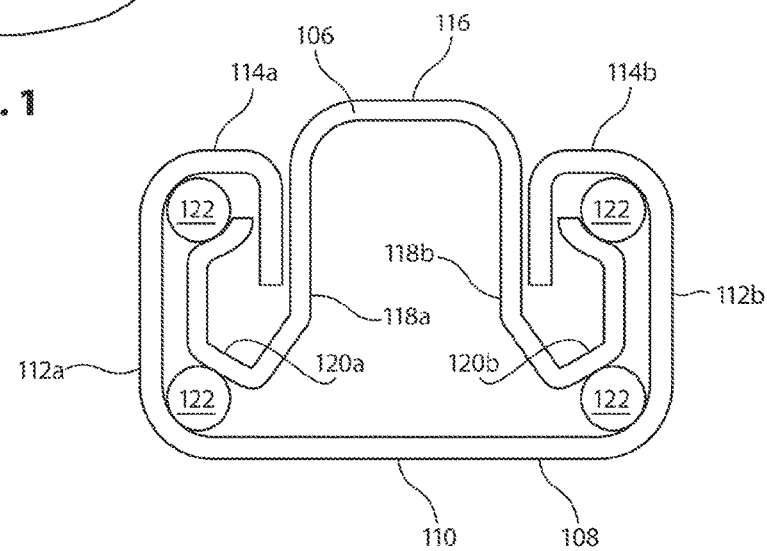
FIG. 2 includes a cross-sectional elevation view of a rail of a seat track assembly in accordance with an embodiment.

Each rail 102 and 104 may include laterally spaced apart receivers (also referred to herein as components) 106 and 108, longitudinally translatable with respect to each other (FIG. 2). In a non-limiting embodiment, the receivers 106 and 108 can define a top receiver and a bottom receiver, respectively. The top receiver 106 can be attached to the frame 8 while the lower receiver 108 attaches to the floor 14. In an alternate embodiment, the receivers 106 and 108 can define a left receiver and a right receiver, or can have any other suitable spatial relationship with respect to one another. For example, one of the receivers 106 or 108 may be disposed radially inside of the other receiver 106 or 108.

In an embodiment, the receivers 106 and 108 can each include a rigid material, such as, for example, a metal, an alloy, a ceramic, or a polymer. In this regard, the receivers 106 and 108 can resist significant deformation upon application of a loading force condition, e.g., a transverse force applied to the receivers from the bottom portion 4 of the seat. In a particular embodiment, the receivers 106 and 108 can include steel.

The receivers 106 and 108 may optionally be coated with a layer to protect against corrosion or other potential damage. In particular embodiments, at least one of the receivers 106 or 108 or components thereof, may be coated with one or more temporary corrosion protection layers to prevent corrosion thereof prior to processing. Each of the layers can have a thickness in a range of 1 micron and 50 microns, such as in a range of 7 microns and 15 microns. The layers can include a phosphate of zinc, iron, manganese, or any combination thereof. Additionally, the layers can be a nano-ceramic layer. Further, layers can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Temporary corrosion protection layers can be removed or retained during processing.

In particular embodiments, at least one of the receivers 106 or 108 or portions thereof may further include a permanent corrosion resistant coating. The corrosion resistant coating can have a thickness of in a range of 1 micron and 50 microns, such as in a range of 5 microns and 20 microns, or even in a range of 7 microns and 15 microns. The corrosion resistant coating can include an adhesion promoter layer and an epoxy layer. The adhesion promoter layer can include a phosphate of zinc, iron, manganese, tin, or any combination thereof. Additionally, the adhesion promoter layer can be nano-ceramic layer. The adhesion promoter layer can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof.

The epoxy layer can be a thermal cured epoxy, a UV cured epoxy, an IR cured epoxy, an electron beam cured epoxy, a radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin can include synthetic resin modified epoxies based on phenolic resins, urea resins, melamine resins, benzoguanamine with formaldehyde, or any combination thereof. By way of example, epoxies can include mono epoxoide, bis epoxide, linear tris epoxide, ramified tris epoxide, or any combination thereof, wherein $C_XH_YX_ZA_U$ is a linear or ramified saturated or unsaturated carbon chain with optionally halogen atoms $X_Z$ substituting hydrogen atoms, and optionally where atoms like nitrogen, phosphorous, boron, etc, are present and B is one of carbon, nitrogen, oxygen, phosphorous, boron, sulfur, etc.

The epoxy resin can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_XH_YX_ZA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof. Generally, amines can be primary amines, secondary amines, or tertiary amines conforming to the formula $R_1R_2R_3N$ where R can be $C_XH_YX_ZA_U$ as described above.

In an embodiment, the epoxy layer can include fillers to improve conductivity, such as carbon fillers, carbon fibers, carbon particles, graphite, metallic fillers such as bronze, aluminum, and other metals and their alloys, metal oxide fillers, metal coated carbon fillers, metal coated polymer fillers, or any combination thereof. The conductive fillers can allow current to pass through the epoxy coating and can increase the conductivity of the coated bushing as compared to a coated bushing without conductive fillers.

In an embodiment, the epoxy layer can increase the corrosion resistance. For example, the epoxy layer can substantially prevent corrosive elements, such as water, salts, and the like, from contacting the receiver 106 or 108, thereby inhibiting chemical corrosion thereof. Additionally, the epoxy layer can inhibit galvanic corrosion by preventing contact between dissimilar metals.

Application of the corrosion resistant layer can include applying an epoxy coating. The epoxy can be a two-component epoxy or a single component epoxy. Advantageously, a single component epoxy can have a longer working life. The working life can be the amount of time from preparing the epoxy until the epoxy can no longer be applied as a coating. For example, a single component epoxy can have a working life of months compared to a working life of a two-component epoxy of a few hours.

In an embodiment, the epoxy layer can be applied by spray coating, e-coating, dip spin coating, electrostatic coating, flow coating, roll coating, knife coating, coil coating, or the like. Additionally, the epoxy layer can be cured, such as by thermal curing, UV curing, IR curing, electron beam curing, irradiation curing, or any combination thereof. Preferably, the curing can be accomplished without increasing the temperature of the component above the breakdown temperature of any of the sliding layer, the adhesive layer, the woven mesh, or the adhesion promoter layer. Accordingly, the epoxy may be cured below about 250° C., even below about 200° C.

In an embodiment, the corrosion resistant coating, and particularly the epoxy layer, can be applied to cover the exposed edges of the receivers 106 or 108. E-coating and electrostatic coating can be particularly useful in applying the corrosion resistant coating layers to all exposed metallic surfaces without coating the non-conducting sliding layer. Further, it is preferable for the corrosion resistant coating to continuously cover the exposed surfaces without cracks or voids. The continuous, conformal covering can substantially prevent corrosive elements such as salts and water from contacting the receivers 106 and 108.

In certain embodiments, the rails 102 and 104 can be identical, or nearly identical with respect to one another. In this regard, specific reference to either rail 102 or 104 may also describe a suitable configuration for the other rail 102 or 104.

Referring now to FIG. 2, a cross section of rail 102 is illustrated. In a non-limiting embodiment, the lower receiver 108 includes a channel portion having a base 110, two opposing sidewalls 112a and 112b extending from the base, and opposing upper flanged portions 114a and 114b at the terminating upper portions of the sidewalls. The upper receiver 106 can include an inverted configuration, generally opposite the lower receiver 108, having a top 116, two opposing sidewalls 118a and 118b extending downward from the top, and opposing end portions 120a and 120b at the terminating lower portions of the opposing sidewalls. The end portions 120a and 120b may have other configurations than those illustrated in FIG. 2. End portions 120a and 120b are arranged to correspond with upper flanged portions 114a and 114b, respectively.

The receivers 106 and 108 can be arranged lengthwise with respect to each other in an interlocking arrangement. The flanged portions 114a and 114b and end portions 120a and 120b of the lower and upper receivers 108 and 106, respectively, can fit together and slidingly interconnect with one another, allowing the upper and lower receivers 106 and 108 to functionally translate with respect to one another in a longitudinal direction without transversely detaching.

In certain embodiments, the receivers 106 and 108 may be reflectively symmetrical about a vertically intersecting plane. In this regard, the structure of the left and right sides of each rail 102 and 104 may have the same structure and size. This may enable even load sharing along the left and right sides of the rails 102 and 104, resulting in increased structural strength. In other embodiments, the receivers 106 and 108 may be asymmetrical about a vertically intersecting plane. This may permit specific shaping of the rails 102 and 104 to transmit and support specific loading arrangements.

One or more sliding members 122 can be disposed between the receivers 106 and 108. More particularly, a plurality of sliding members 122 can be disposed between and interspace the receivers 106 and 108 from one another. In this regard, the sliding members 122 may be interposed between and bear against the receivers 106 and 108.

At least one of the sliding members 122 may be free of an externally applied lubricant. In an embodiment, at least one of the sliding members 122 may be self-lubricating.

Typical ball bearing arrangements as seen in known seat track assemblies require use of a lubricant to prevent binding and grinding between the rails or ball bearings. Most notably, the lubricant may consist of a quasi- or semisolid lubricant such as, for example, a grease. The grease may be applied along an outer surface of the ball bearings; however, during operation it may peel or strip therefrom, thus dirtying the internal cabin of the vehicle. Loose grease may collect particles and cabin dirt, changing the sliding dynamics within the ball bearing seat track assembly. Moreover, loss of grease along the outer surface of the ball bearings may change force characteristics in the seat assembly, making it more difficult to longitudinally translate the receivers and with respect to one another.

In accordance with one or more of the embodiments described herein, at least one of the sliding members 122 can at least partially include a low friction material. For example, a fluoropolymer, such as polytetrafluoroethylene (PTFE). Other exemplary fluoropolymers can include a fluorinated ethylene propylene (FEP), a polyvinylidene fluoride (PVDF), a perfluoroalkoxy (PFA), a terpolymer of tetrafluoroethylene, a hexafluoropropylene and vinylidene fluoride (THV), a polychlorotrifluoroethylene (PCTFE), an ethylene tetrafluoroethylene copolymer (ETFE), an ethylene chlorotrifluoroethylene copolymer (ECTFE), or any combination thereof. Additionally, it is possible to use other sliding materials, such as for example, those marketed by the applicant under the trademark Norglide®. In another embodiment, at least one of the sliding members 122 can include a polyimide, such as for example, those marketed by the applicant under the trademark Meldin® 2000, 7000, 8100, or 9000, or a thermoplastic, such as for example, those marketed by the Applicant under the trademark Meldin® 1000, 3100, or 5000.

Figure 3A:
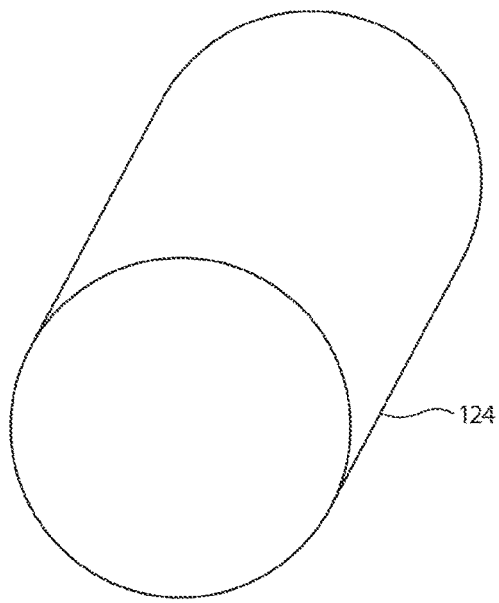
FIG. 3A to 3J include cross-sectional elevation view of structures in accordance with several embodiments.

Referring to FIG. 3A, in a particular aspect, at least one of the sliding members 122 may include an elongated tube or structure (hereinafter structure 124) having a sidewall extending between opposing terminal (axial) ends thereof. The sidewall may extend a length, L, between the opposing terminal ends.

The length, L, of the structure 124 may be greater than a width, W, and height, H, thereof. For example, the length of the structure 124 may be greater than 1.0 W and 1.0 H (1.0 W and H), such as greater than 1.5 W and H, greater than 2.0 W and H, greater than 2.5 W and H, greater than 3.0 W and H, greater than 3.5 W and H, greater than 4.0 W and H, greater than 4.5 W and H, greater than 5.0 W and H, greater than 6.0 W and H, greater than 7.0 W and H, greater than 8.0 W and H, greater than 9.0 W and H, or even greater than 10.0 W and H. The length, L, may be no greater than 500 W and H, such as no greater than 400 W and H, no greater than 300 W and H, no greater than 200 W and H, or even no greater than 100 W and H.

The structure 124 may have a maximum width or height (or diameter in the case of an ellipsoidal cross sectional profile) of at least 1 mm, such as at least 2 mm, at least 3 mm, at least 4 mm, or even at least 5 mm. The maximum width or height (or diameter in the case of an ellipsoidal cross sectional profile) can be no greater than 75 mm, such as no greater than 60 mm, no greater than 45 mm, no greater than 30 mm, no greater than 15 mm, or even no greater than 10 mm. The length, L, of the structure 124 may be at least 1 mm, such as at least 5 mm, at least 10 mm, at least 20 mm, at least 30 mm, or even at least 40 mm. The length may be no greater than 750 mm, such as no greater than 500 mm, or even no greater than 250 mm.

In an embodiment, at least one of the structures 124 may have an outer surface defining an ellipsoidal cross section. The sidewall of the structure 124 may have an arcuate cross-sectional profile defining a closed curve. In a more particular embodiment, the radius of curvature of the sidewall may be constant along a perimeter thereof. In another more particular embodiment, the radius of curvature of the sidewall may be different at different locations therealong. For example, the sidewall may define an ovular cross-sectional profile (e.g., FIG. 3J). Exemplary ovular profiles include a Cassini oval, a superellipse, a Cartesian oval, an elliptical oval, or a vesica piscis.

In another embodiment, at least one of the structures 124 may have a polygonal cross section. For example, the structure 124 may have a cross section selected from the following shapes: a triangle, a quadrilateral, a pentagon, a hexagon, a heptagon, an octagon, a nonagon, a decagon, a hendecagon, a dodecagon, or another suitable polygonal shape. In an embodiment, the cross-sectional profile of at least one of the structures 124 may be a regular polygon such that it is both equilateral and equiangular (e.g., FIG. 3E). In another embodiment, the cross-sectional profile of the structure 124 may be an irregular polygon such that it is not equilateral, equiangular, or both.

In yet another embodiment, at least one of the structures 124 may have a cross section with a polygonal portion and an ellipsoidal portion. For example, a first portion of the cross section may include a generally arcuate surface while a second portion may include one or more straight segments interconnected by a relative angle therebetween. In an embodiment, an outer profile having both polygonal portions and ellipsoidal portions may more accurately fit within the space between the receivers 106 and 108, forming a more uniform contact interface and creating a more uniform pressure profile therebetween.

Figure 3B:
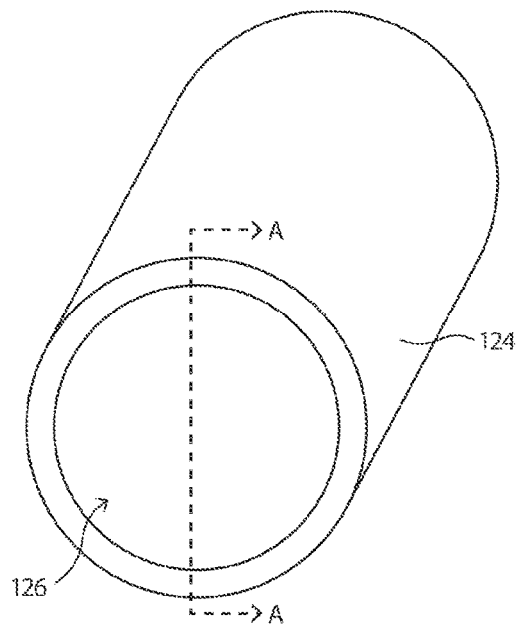

Referring to FIG. 3B, in an embodiment, one or more apertures 126 may extend at least partially between opposing terminal ends of the structure 124. The aperture may extend at least 0.05 L, such as at least 0.1 L, at least 0.2 L, at least 0.3 L, at least 0.4 L, at least 0.5 L, at least 0.6 L, at least 0.7 L, at least 0.8 L, or even at least 0.9 L. In a particular embodiment, the aperture(s) 126 may extend entirely through the length of the structure 124. It is possible to have an aperture 126 in some, but not all, of the structures 124. Moreover, it is possible to have apertures 126 with different lengths, widths and shapes at different locations or the same relative locations within different structures 124. In this regard, the apertures 126 can be disposed along the structures 124 at suitable locations.

In a particular embodiment, the aperture 126 may include a uniform profile as measured along the length of the structure 124. In such a manner, the aperture 126 can extend uniformly along the length of the structure 124. In another embodiment, the aperture 126 can have a varying (changing) cross-sectional shape as measured along the length of the structure 124. For example, the aperture 126 may have a first diameter at a first location along the length of the structure 124 and a second diameter different from the first diameter at a second location along the length of the structure 124. In such a manner, the profile of the aperture 126 can be made to be suitable for specific pressure profiles and gradients exhibited along certain locations of the seat track assembly 100. For example, the aperture may be smaller near locations where higher pressures will be exerted against the structure.

Each of the apertures 126 may define an ellipsoidal cross section, a polygonal cross section, or a combination thereof. FIGS. 3C to 3J illustrate exemplary cross sectional profiles of the structures and aperture(s).

Figure 3C:
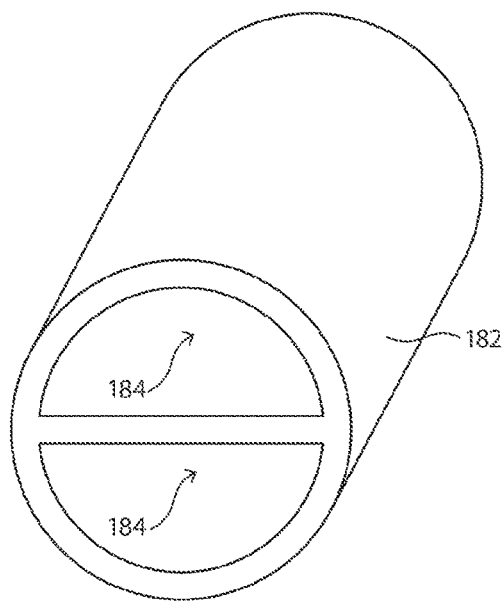

FIG. 3C illustrates a structure 182 having a plurality of apertures 184 and 184. Each aperture 184 and 184 can extend at least partially along a length of the structure 182. In an embodiment, the apertures 184 and 184 can extend equidistant through the structure 182. In another embodiment, the apertures can have different lengths. In a particular embodiment, the apertures can extend between different end points relative to the length of the structure 182. That is, axial ends of the apertures can terminate at different relative positions along the length of the structure 182. As illustrated, the apertures 184 and 184 can be reflectively symmetrical about a plane intersecting the structure 182. In an embodiment, at least one of the apertures 184 may have a uniform shape as measured along the entire length thereof. In another embodiment, at least one of the apertures 184 may have a varying shape as measured along the length thereof.

Figure 3D:
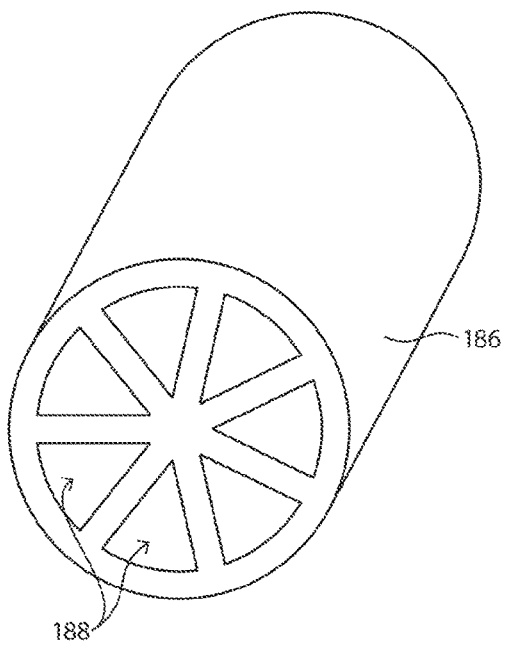
Figure 3E:
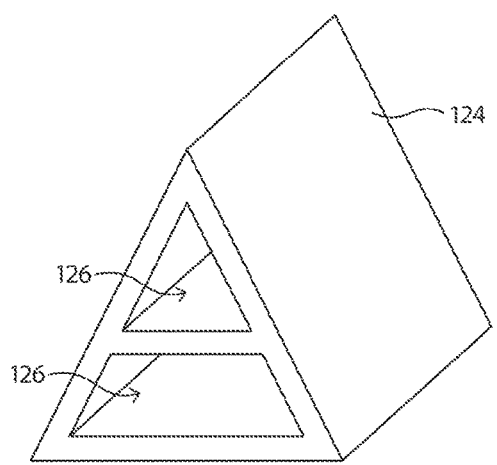
Figure 3F:
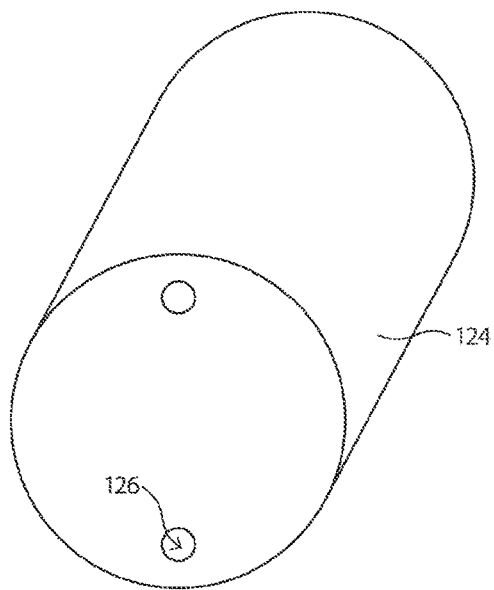
Figure 3G:
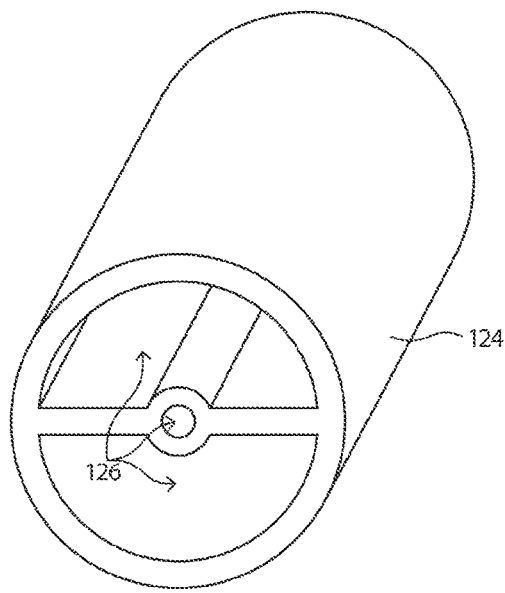
Figure 3H:
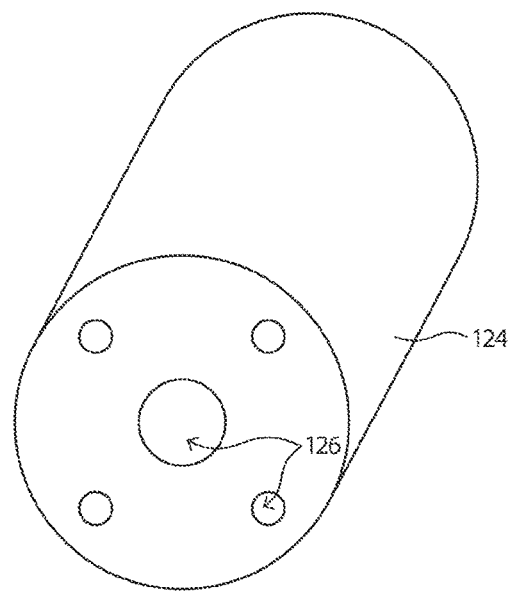
Figure 3I:
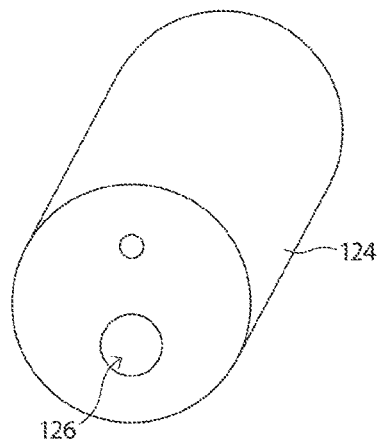
Figure 3J:
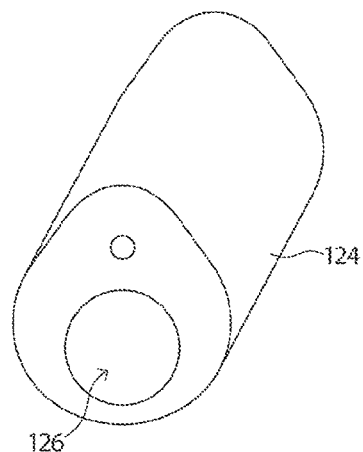

FIG. 3D illustrates a structure 186 having a plurality of apertures 188. The apertures 188 can each have a polygonal cross-sectional shape, e.g., a triangular shape. At least two of the apertures 188 can be rotationally symmetrical with one another. In a particular embodiment, the apertures 188 can be rotationally symmetrical about a central axis of the structure 186. In another embodiment, the apertures 188 can be rotationally symmetrical about a line that is spaced apart from the central axis of the structure 186. In a non-illustrated embodiment, the apertures 186 may be both rotationally and reflectively symmetrical.

FIGS. 3E to 3J illustrate various other arrangements and configurations for structure 124 and apertures 126 disposed therein. The illustrated embodiments are not intended to limit the scope of the disclosure. Skilled artisans will recognize that many other shapes and configurations are possible for the structures 124 and the apertures 126. For example, in a non-illustrated embodiment, at least one of the apertures may extend between the terminal end of the structure and the sidewall thereof. In such a manner, a central axis of the aperture is not parallel with the central axis of the structure. Moreover, the elements illustrated in the figures can be interchanged, combined, or removed in any combination to provide suitable force and tolerance compensating characteristics.

Figure 4A:
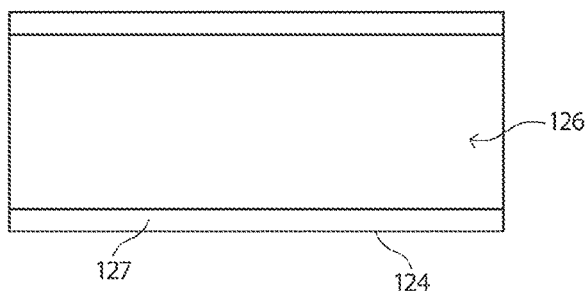
FIGS. 4A and 4B include cross-sectional side elevation views of the structure of FIG. 3B as seen along Line A-A in accordance with certain embodiments.

In an embodiment, at least one of the structures 124 can have a homogeneous composition (e.g., FIG. 4A). In this regard, the entire structure 124 can include a single material. More particularly, the entire structure 124 can include a low friction material 127, such as, for example, those materials described above.

Figure 4B:
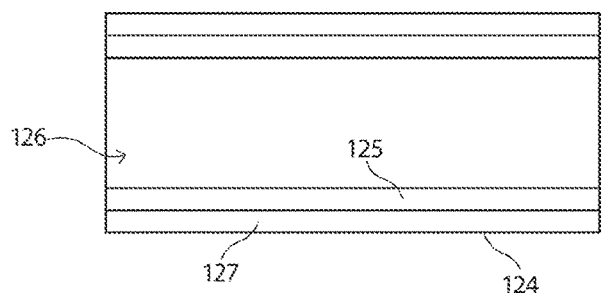
Figure 4C:
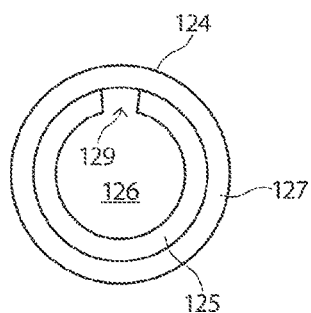
FIG. 4C includes a top view of the structure of FIG. 4B in accordance with an embodiment.

In another embodiment, such as illustrated in FIGS. 4B and 4C, at least one of the structures 124 can have a composite construction. For example, the structure 124 may include a low friction material 127 coupled to a substrate 125. Exemplary substrates 125 include a metal, metal alloy, a ceramic, or a polymer, such as an elastomer. The substrate 125 may be disposed at least partially within one or more of the apertures 126 of the structure 124. In a more particular embodiment, the substrate 125 may be fully disposed within at least one of the apertures 126.

In an embodiment, the substrate 125 can be disposed within the structure 124 so as to be at least partially positioned along an outer perimeter of the aperture 126. More particularly, the substrate 125 can be positioned along an entire perimeter of the aperture 126. For example, the substrate 125 may comprise a strip or layer of material disposed along an outer surface of the aperture 126. The strip or layer may have a thickness that is less than half the diameter of the aperture 126. In an embodiment, the strip may not fully occupy the entire aperture 126.

In a particular embodiment, the substrate 125 may include a spring. Exemplary springs include helical springs formed of circular or otherwise ellipsoidal wire and helical springs formed of rectangular or otherwise polygonal wire. The helical spring may include a plurality of coils, such as at least 2 coils, at least 3 coils, at least 4 coils, at least 5 coils, at least 10 coils, at least 25 coils, or even at least 100 coils. In an embodiment, the helical spring may include no greater than 10,000 coils, such as no greater than 5,000 coils, or even no greater than 1,000 coils.

In an embodiment, the coils may be canted within the aperture 126. That is, the coils may be angularly biased within the aperture 126. This may reduce compressive force necessary to deform the structure 124 in a radial direction as compared to a structure 124 having a spring with non-canted coils.

In an embodiment, the spring may be secured within the aperture 126 by an interference fit with the low friction material 127. In another embodiment, the spring may be secured within the aperture 126, for example, by an adhesive, a mechanical fastener, another suitable engagement element or method, or a combination thereof.

In an embodiment, the spring may at least partially embed within the low friction material 127. That is, a portion of at least one of the coils (e.g., a radially outermost surface of the at least one coil) may extend radially outward beyond the original aperture 126 into the low friction material 127.

Another suitable spring may include a ring formed from a sheet of material rolled to a generally cylindrical configuration. In a particular embodiment, the ring may be formed of a steel, such as spring steel. In an embodiment, the ring may have a wall thickness of at least 0.1 mm, such as at least 0.2 mm, at least 0.3 mm, at least 0.4 mm, or even at least 0.5 mm. In an embodiment, the ring may have a wall thickness of no greater than 10 mm, no greater than 3 mm, such as no greater than 2.5 mm, no greater than 2.0 mm, no greater than 1.5 mm, or even no greater than 1.0 mm.

A gap 129 may extend along at least part of the axial length of the ring. In a particular embodiment, the gap 129 may extend along the full axial length thereof. In this regard, the ring can be a split ring having a generally C-shaped configuration when viewed along a central axis thereof. In a particular embodiment, the gap 129 may be closed (e.g., by welding).

In an embodiment, the circumferential width of the gap 129 may be different after installation of the spring into the aperture 126 as compared to the gap prior to installation. In a particular embodiment, the circumferential width of the gap 129 may decrease after installation of the spring into the aperture 126.

In accordance with one or more embodiments, the spring may provide a spring rate in a radially outward direction so as to outwardly bias the low friction material 127. In certain embodiments, structure 124 including the spring may exhibit progressive, linear, or degressive spring rate characteristic.

In an embodiment, the spring rate of the structure including the spring may be at least 10 N/mm, such as at least 50 N/mm, at least 100 N/mm, at least 150 N/mm, at least 200 N/mm, at least 250 N/mm, at least 300 N/mm, at least 350 N/mm, or even at least 400 N/mm. In an embodiment, the spring rate of the structure 124 including the spring may be no greater than 800 N/mm, such as no greater than 700 N/mm, no greater than 600 N/mm, no greater than 550 N/mm, no greater than 500 N/mm, or even no greater than 450 N/mm. Structures with high spring rates may provide greater structural support with reduced tolerance absorption, while structures with low spring rates may better absorb tolerance and misalignment within the seat track assembly.

In a non-limiting example, the structure 124 has an outer diameter of 6.7 mm, and a centrally disposed aperture 126 having a diameter of 5.7 mm. A split ring spring having the same length as the structure 124 is inserted into the aperture 126. The split ring has a wall thickness of 0.4 mm, a circumferential gap width of 1.5 mm, and an outer diameter of 5.8 mm. Force is applied to the structure 124 along the outer surface in a direction normal thereto. Application of a force of 64 N compresses the structure by 0.15 mm. Application of a force of 82 N compresses the structure by 0.2 mm. Application of a force of 98 N compresses the structure by 0.25 N.

In an embodiment, the spring may operate in a compressed state, providing an outwardly biasing pressure against the low friction material 127 in all, or most, conditions.

Skilled artisans will understand that other spring configurations may be suitable and that the spring configuration is not limited to the exemplary embodiments described above.

In a non-illustrated embodiment, the substrate 125 may be disposed within one or more of the structures 124 at a location spaced apart from the aperture(s) 126. For example, a sidewall of the structure 124 may have an embedded substrate contained, or at least partially contained, therein.

In an embodiment, the substrate may be fully encapsulated in the low friction material. In this regard, an entire outer, exposed surface of the structure 124 may include the low friction material. In another embodiment, the substrate may be exposed along a portion thereof, such as, for example, along the opposing terminal ends. In such a manner, the substrate may be encapsulated only along the perimeter of the aperture 126.

Substrates of different materials may be utilized in different structures 124 or even within the same structure 124. In an embodiment, the substrates of different materials may be disposed within different apertures 126 of the same structure 124. In an embodiment, substrates of different materials may even be disposed within the same aperture 126 at different relative positions therein. For example, the multiple substrates can extend adjacent to one another along at least a portion of the length of the aperture 126. Alternatively, the multiple substrates may be disposed in contiguous sections, each along a portion of the length of the aperture 126. In an embodiment, the multiple substrates may be coaxial, e.g., the different substrates each form a layer of a single substrate.

The force and tolerance profile of the structure 124 may be adjusted or suitably engineered at various locations along the length of the structure 124 by varying the number and location of the apertures 126 within the structure 124 and by including or excluding use of one or more substrates therein. For example, decreasing a volume of material in the structure 124 by increasing the size or number of the apertures 126 therein may reduce transverse stiffness of the structure 124. This may allow for greater tolerance absorption. Conversely, utilizing a substrate within the aperture(s) 126, or utilizing a structure 124 devoid of apertures 126, may increase transverse stiffness of the structure 124 relative to a structure having an aperture devoid of a substrate therein.

The arrangement and configuration of the structures 124 within the seat track assembly 100 is configurable with respect to location that the structure is disposed within the seat track assembly 100 and loading conditions therealong. For example, it may be desirable to utilize a structure 124 having at least one aperture 126 including a substrate at locations experiencing high transverse loading conditions (e.g., at primarily load bearing areas within the seat track assembly), while a structure having an open (empty) aperture 126 may be more desirable at a location requiring a high degree of tolerance compensation (e.g., at non-load bearing areas within the seat track assembly 100) where deformation of the structure 124 may allow for absorption of misalignment and variances between the receivers 106 and 108. By arranging the structures 124 in a suitable configuration, desirable tolerance and strength properties can be achieved along the seat track assembly 100.

In an embodiment, a first structure having an open aperture may be disposed between the opposing upper flanged portion 114a of the receiver 108 and the end portion 120a of the receiver 106, while a second structure having a filled aperture or no aperture may be disposed between the receiver 106 and the base 110 of the receiver 108 (FIG. 2). In such a manner, the second structure can provide vertical support between the receivers 106 and 108 with minimal tolerance absorption, while the first structure can provide tolerance absorption and form a zero clearance fit within the rail 102, preventing rattling and undesirable transverse play therein.

Figure 5:
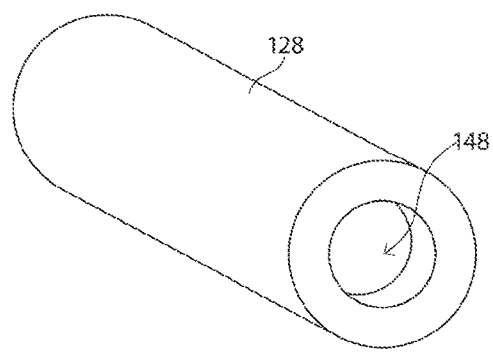
FIG. 5 includes a perspective view of a slide pin in accordance with an embodiment.

Referring now to FIG. 5, in another aspect, at least one of the sliding members may include a slide pin 128. The slide pin 128 can include an elongated cylinder having a length, $L_{SP}$, and a diameter, $D_{SP}$. The slide pin 128 can define an aspect ratio, as measured by a ratio of the length to width. Unlike with ball bearings, it is not required that the aspect ratio be 1:1. For example, the slide pin 128 can have an aspect ratio of at least 1.1:1, such as at least 1.5:1, at least 2:1, at least 3:1, at least 4:1, at least 5:1, or even at least 10:1. The aspect ratio may be as great as 1,000:1. In another embodiment, the slide pin 128 can have an aspect ratio of no greater than 0.9:1, such as no greater than 0.5:1, or even no greater than 0.25:1. The aspect ratio may be as small as 0.001:1.

Prior to installation between the receivers 106 and 108, the slide pin 128 can have a generally cylindrical sidewall extending between opposing terminal ends. The generally cylindrical sidewall can define an average preassembled diameter, as measured prior to installation between receivers 106 and 108, and an average assembled diameter, as measured after installation between the receivers 106 and 108, different than the average preassembled diameter. More particularly, the average assembled diameter can be less than the average preassembled diameter. In this regard, the slide pin 128 may be oversized prior to installation, adapted to absorb tolerances within the space between the receivers 106 and 108. Additionally, the slide pins 128 may maintain a zero clearance between the receivers 106 and 108.

Figure 6:
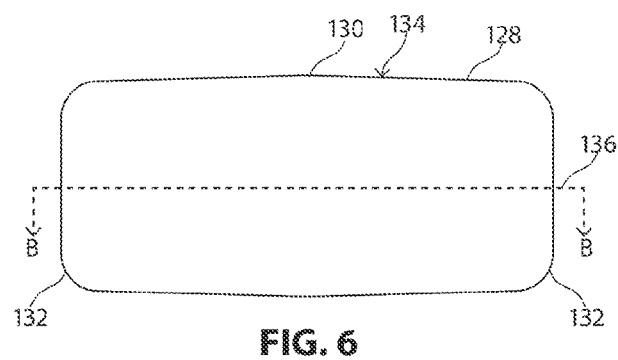
FIG. 6 includes a side elevation view of the slide pin in accordance with an embodiment.

Referring to FIG. 6, in a more particular embodiment, prior to installation between the receivers 106 and 108, the slide pin 128 can have a barrel shape, such that the diameter of the slide pin 128 is greater at a middle portion 130 as compared to an end portion 132 thereof. For example, the diameter of the middle portion can be 101% the diameter of the end portion, such as at least 102% the diameter of the end portion, at least 103% the diameter of the end portion, at least 104% the diameter of the end portion, at least 105% the diameter of the end portion, at least 110% the diameter of the end portion, at least 115% the diameter of the end portion, at least 120% the diameter of the end portion, at least 125% the diameter of the end portion, at least 130% the diameter of the end portion, at least 135% the diameter of the end portion, at least 140% the diameter of the end portion, at least 145% the diameter of the end portion, or even at least 150% the diameter of the end portion. The diameter of the middle portion can be no greater than 250% the diameter of the end portion, such as no greater than 200% the diameter of the end portion, or even no greater than 175% the diameter of the end portion.

In an embodiment, an outer surface 134 of the slide pin 128 may extend at a constant angle relative to a central axis 136 of the slide pin 128, as measured from one of the end portions 132 to the middle portion 130. In another embodiment, an angle of the outer surface 134 can vary between the end portion 132 and the middle portion 130.

In a particular embodiment, upon installation between the receivers 106 and 108, the outer surface 134 of at least one of the slide pins 128 may deform from a barrel shape to a cylindrical, or generally cylindrical, shape where the diameter of the middle portion 130, as measured in the assembled state, is less than the diameter of the middle portion 130, as measured prior to assembly. In such a manner, the slide pin 128 may compress, accommodating for tolerances and misalignments within the space between the receivers 106 and 108.

Figure 7A:
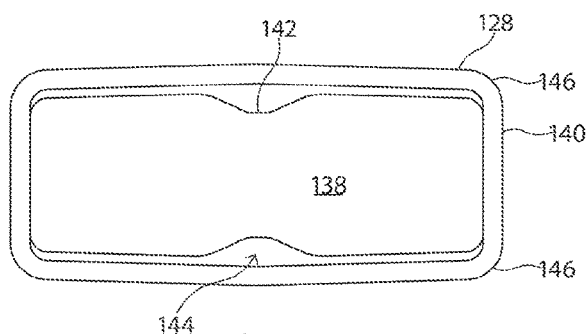
FIG. 7A includes a cross-sectional side elevation view of the slide pin as seen prior to installation in the rail in accordance with an embodiment, as seen along line B-B in FIG. 6.
Figure 7B:
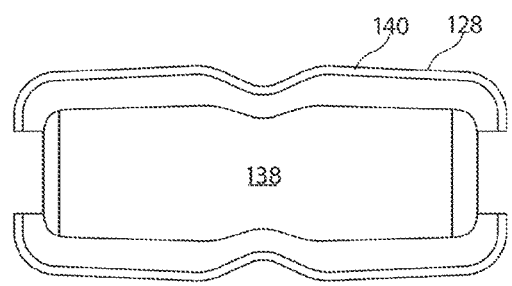
FIG. 7B includes a cross-sectional side elevation view of the slide pin as seen after installation in the rail in accordance with an embodiment, as seen along line B-B in FIG. 6.
Figure 8:
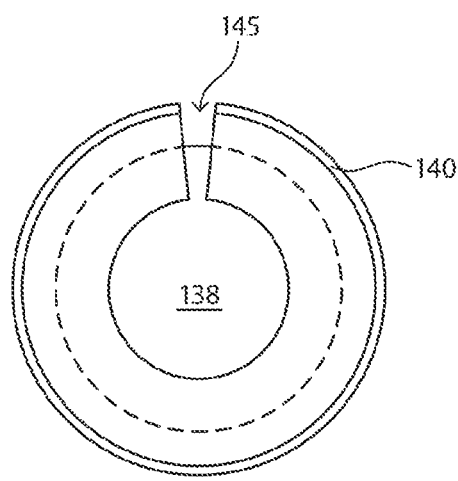
FIG. 8 includes a top elevation view of the slide pin in accordance with an embodiment.

As seen in FIGS. 7A, 7B and 8, the slide pin 128 may include a substrate 138 and a low friction material 140. The substrate 138 can include a rigid material, such as a metal or a polymer. More particularly, the substrate 138 can include a steel, such as spring steel. The substrate 138 can define a generally cylindrical shape. In an embodiment, the substrate 138 is solid, devoid of hollow portions. In an alternate embodiment, the substrate 138 may be hollow, including a cavity, such as a central cavity. Solid substrates may be more suitable for load bearing application whereas hollow substrates may accommodate misalignment and tolerances between the receivers. Thus, suitable substrate configuration may be determined based on relative location within the seat track assembly 100. In certain embodiments, all of the slide pins may be the same as one another. In other embodiments, at least two slide pins in the assembly may be different from one another.

In certain embodiments, the substrate 138 may include an annular depression 142 having a diameter less than a maximum diameter of the substrate 138 (e.g., FIG. 7A). For example, the diameter of the annular depression 142 may be no greater than 99% of the maximum diameter of the substrate, such as no greater than 98% of the maximum diameter of the substrate, no greater than 97% of the maximum diameter of the substrate, no greater than 96% of the maximum diameter of the substrate, no greater than 95% of the maximum diameter of the substrate, no greater than 90% of the maximum diameter of the substrate, or even no greater than 75% of the maximum diameter of the substrate. Moreover, the diameter of the annular depression 142 can be no less than 25% of the maximum diameter of the substrate.

In a further embodiment, the substrate can include at least two annular depressions, such as at least three annular depressions, or even at least four annular depressions. The annular depressions may extend entirely around the circumference of the substrate 138 or along a portion of the circumference of the substrate. The annular depressions may have the same dimensional characteristics with respect to each other. In another embodiment, at least two of the annular depressions can have different dimensional characteristics with respect to each other.

In an embodiment, the annular depression 142 can be centrally disposed along the length of the substrate 138. In another embodiment, the annular depression 142 can be offset from the middle portion 130 of the substrate 138. For example, the annular depression 142 may be offset from the middle portion 130 by at least 1% of the length of the substrate, such as by at least 2% of the length of the substrate, by at least 3% of the length of the substrate, by at least 4% of the length of the substrate, by at least 5% of the length of the substrate, by at least 10% of the length of the substrate, by at least 15% of the length of the substrate, by at least 20% of the length of the substrate, by at least 25% of the length of the substrate, by at least 30% of the length of the substrate, by at least 35% of the length of the substrate, by at least 40% of the length of the substrate, or even by at least 45% of the length of the substrate. In an embodiment, the annular depression 142 may be offset from the middle portion 130 by no greater than 50% of the length of the substrate, such as by no greater than 49% of the length of the substrate, by no greater than 48% of the length of the substrate, by no greater than 47% of the length of the substrate, or even by no greater than 46% of the length of the substrate.

The annular depression 142 can extend along at least 10% of the length of the substrate, along at least 20% of the length of the substrate, along at least 30% of the length of the substrate, along at least 40% of the length of the substrate, or even along at least 50% of the length of the substrate. In an embodiment, the annular depression 142 can extend along no greater than 80% of the length of the substrate, such as no greater than 70% of the length of the substrate.

The low friction material 140 can extend around a circumference of the substrate 138 so as to form an outer layer of the slide pin 128. The low friction material 140 can contact an outer surface of the substrate 138 along at least a portion thereof. Those embodiments including an annular depression 142 may include a void 144 between the outer surface of the substrate 138 and an inner surface of the low friction material 140, as seen in the preinstalled state. In certain embodiments, upon installation, the low friction material 140 can at least partially collapse into the void 144 (FIG. 7B). This may allow the slide pin 128 to adjust for the tolerances and misalignments between the receivers.

In an embodiment, the low friction material 140 can be coupled to at least a portion, such as all, of the substrate 138. In a particular embodiment, the low friction material 140 can be extruded or molded over the substrate 138. The low friction material 140 may be overmolded, injection molded, or otherwise positioned over the substrate 138 in a molten, or semi-molten state.

In another embodiment, the low friction material 140 can include a generally hollow cylinder. The substrate 138 can be urged into the hollow interior of the cylinder, for example, by pressing the substrate 138 in a direction between opposing axial ends of the low friction material 140. In an embodiment, the low friction material 140 can include a gap 145. The gap 145 may extend along at least a portion of the axial length of the low friction material 140. More particularly, the gap 145 may extend along the entire axial length of the low friction material 140. In an embodiment, the circumferential ends of the low friction material 140 may be spaced apart by at least 1°, such as at least 2°, at least 3°, at least 4°, at least 5°, or even at least 10°. In particular embodiments, the gap may allow the substrate 138 to pass into the hollow interior of the cylinder in a transverse direction.

In yet a further embodiment, the low friction material 140 can include a rolled sheet of low friction material. A blank may be cut from a sheet of material. The sheet of material may be homogenous or have a composite construction. The blank can include a polygonal shape, an arcuate shape, or a combination thereof. The blank can be rolled into a generally cylindrical shape (e.g., a barrel shape). Rolling can occur around the substrate 138 or around a template structure. The rolled sheet of material can then be fixed relative to the substrate 138. In an embodiment, fixing of the rolled sheet of material can occur by bending, or crimping, the ends of the low friction material adjacent to the axial ends of the substrate 138. In a particular instance, this can leave a portion of the substrate 138 exposed such that it is visible. In another instance, sizing of the blank can be done such that crimping of the low friction material completely covers the substrate 138. A gap may be present along the axial length of the slide pin. In an embodiment, the gap can be closed, for example, by welding, adhesion, a mechanical interconnect (e.g., a puzzle-piece interface), another suitable method, or any combination thereof.

In particular embodiments, the slide pin 128 can include a low friction material 140 without an internally disposed substrate. The low friction material 140 may include any of the characteristics as described above. For example, the low friction material 140 may include a gap 145 extending along at least a portion of the axial length of the low friction material 140. Usage of a slide pin 128 without an internal substrate may permit greater geometric flexibility. This may enhance tolerance absorption capacity of the slide pin 128.

In an embodiment, the low friction material 140 can define a sidewall thickness, $T_S$, less than a diameter of the substrate 138. For example, the diameter of the substrate 138 can be greater than 1.1 $T_S$, such as greater than 1.5 $T_S$, greater than 2 $T_S$, greater than 3 $T_S$, greater than 4 $T_S$, greater than 5 $T_S$, greater than 6 $T_S$, greater than 7 $T_S$, greater than 8 $T_S$, greater than 9 $T_S$, greater than 10 $T_S$, greater than 15 $T_S$, greater than 20 $T_S$, greater than 25 $T_S$, greater than 50 $T_S$, or even greater than 75 $T_S$. In certain embodiments, the diameter of the substrate 138 can be no greater than 500 $T_S$, such as no greater than 250 $T_S$, or even no greater than 100 $T_S$.

In an embodiment, $T_S$ can be at least 0.1 mm, such as at least 0.5 mm, at least 1 mm, at least 2 mm, at least 3 mm, at least 4 mm, at least 5 mm, or even at least 10 mm. In an embodiment, $T_S$ can be no greater than 75 mm.

The low friction material 140 can be adhered or otherwise secured to the substrate 138 by an adhesive or a mechanical fixture, such as a pin or collar. Alternatively, the low friction material 140 can freely float relative to the substrate 138, permitting relative rotational or axial movement therebetween. In such a manner, the low friction material 140 may slide or rotate relative to the substrate 138.

During installation, the slide pin 128 may be longitudinally insertable between the receivers 106 and 108. In an embodiment, the slide pin 128 can include a rounded edge 146 disposed between the sidewall and at least one of the opposing end portions 132. The rounded edge 146 may act as a guide portion. The rounded edge 146 may facilitate easier alignment between the slide pin 128 and the receivers 106 and 108. In an embodiment, the rounded edge 146 can have a radius of curvature in a range of 0.1 mm and 50 mm, such as in a range of 0.5 mm and 10 mm, or even in a range of 1 mm and 2 mm. In an embodiment, the radius of curvature can be no greater than 10 mm. In a more particular embodiment, the radius of curvature can be approximately 1 mm.

Figure 9:
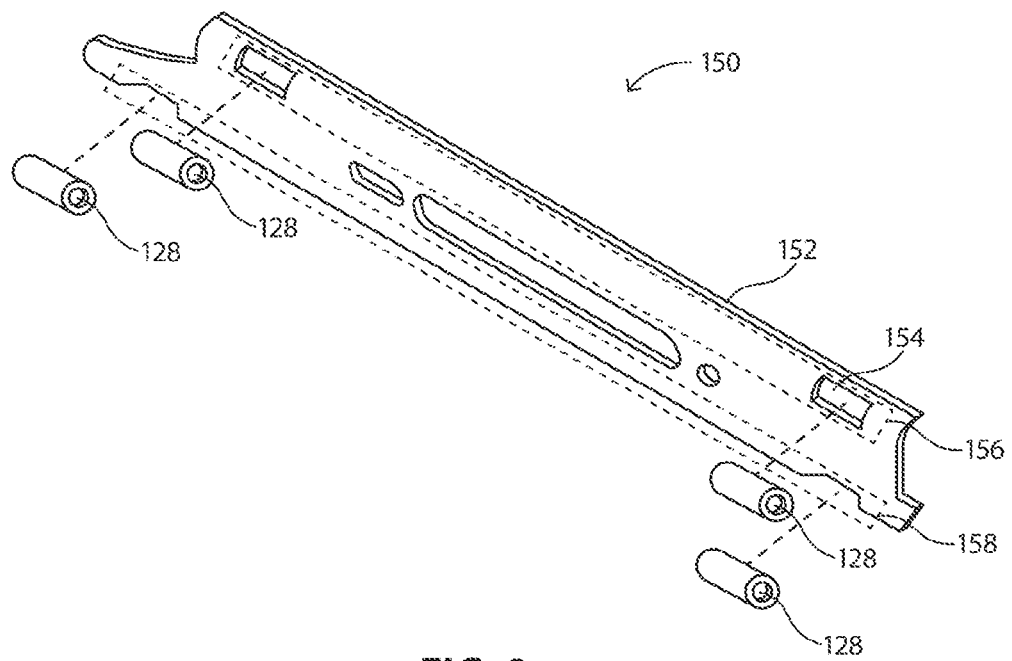
FIG. 9 includes an exploded perspective view of a support feature and slide pins in accordance with an embodiment.

Referring again to FIG. 5, one or more of the slide pins 128 may include at least one opposing axial cavity 148. Referring now to FIG. 9, a pin, post, or other member (not illustrated) of a support feature 150 may be at least partially inserted into the at least one opposing axial cavity 148 of the slide pins 128. The at least one opposing axial cavity 148 may form an interference fit with the support feature 150, preventing relative disconnection therefrom.

The support feature 150 may include a frame 152 having a plurality of openings 154 disposed therein. The frame 152 may include a relatively rigid material, e.g., a rigid polymer, a metal, or an alloy. In an embodiment, the frame 152 may have a length, $L_F$, no greater than the length of the rails of the seat track assembly. For example, the length of the seat track assembly may be at least 1.0 $L_F$, such as at least 1.01 $L_F$, at least 1.02 $L_F$, at least 1.03 $L_F$, at least 1.04 $L_F$, at least 1.05 $L_F$, at least 1.1 $L_F$, or even at least 1.25 $L_F$. In a further embodiment, the length of the seat track assembly may be no greater than 50 $L_F$, such as no greater than 25 $L_F$, no greater than 10 $L_F$, no greater than 5 $L_F$, or even no greater than 2 $L_F$.

In an embodiment, the frame 152 can have a thickness, as measured between opposing major surfaces thereof, of at least 0.1 mm, such as at least 0.5 mm, at least 1 mm, or even at least 5 mm. In a further embodiment, the thickness can be no greater than 50 mm, such as no greater than 20 mm, or even no greater than 10 mm.

The openings 154 can each be sized and shaped to receive a slide pin 128. In a particular embodiment, at least one of the openings 154 may have a generally polygonal shape. In a more particular embodiment, at least one of the openings 154 may have a generally rectangular shape. In another embodiment, at least one of the openings 154 may have an ellipsoidal shape. In a more particular embodiment, at least one of the openings 154 may have an ovular shape. In certain embodiments, at least two of the openings 154 may have a same or similar shape with respect to each other. In a further embodiment, all of the openings 154 may have the same shape with respect to each other. In another embodiment, at least two of the openings 154 may have different shapes with respect to each other. The opposing axial cavities 148 of the slide pins 128 can couple with the frame 152. In an embodiment, the slide pins 128 can freely rotate or slide within the openings 154.

In an embodiment, the support feature 150 may include two rows of openings 154, e.g., a top row 156 and a bottom row 158. In a particular embodiment, the top and bottom rows 156 and 158 can be spaced apart and extend in parallel with respect to each other.

Additional openings may be disposed along the frame 152, for example, between rows 156 and 158. The additional openings may reduce mass of the frame 152. In an embodiment, a component can be disposed within at least one of the additional openings to further enhance relatively slidability within the rail.

The support feature 150 can be shaped to fit between the receivers 106 and 108. In such a manner, the assembled support features 150 (including slide pins 128) may be quickly installed within the rails. In certain embodiments, the support feature 150 may float with respect to the receivers 106 and 108. That is, the support feature 150 may not contact either of the receivers 106 and 108. In particular embodiments, it may be possible to replace old ball bearing races of a preexisting seat assembly with the assembled support features 150 as a replacement, or after market component.

In an embodiment, the top and bottom rows 156 and 158 of the support feature 150 can include different sliding members 122. In a particular embodiment, at least one structure 124 can be disposed within the top row 156 of openings 154 in the support feature 150 while at least one slide pin 128 can be disposed within the bottom row 158 of the openings 154 of the support feature 150. In another particular embodiment, the top row 156 can include all structures 124 whereas the bottom row 158 can include all slide pins 128. More particularly, the bottom row 158 can include filled slide pins 128, i.e., the slide pins 128 include a substrate for increased transverse strength and resistance to deformation. In an alternate embodiment, the top row 156 can include all slide pins 128 and the bottom row 158 can include all structures 124.

Figure 10:
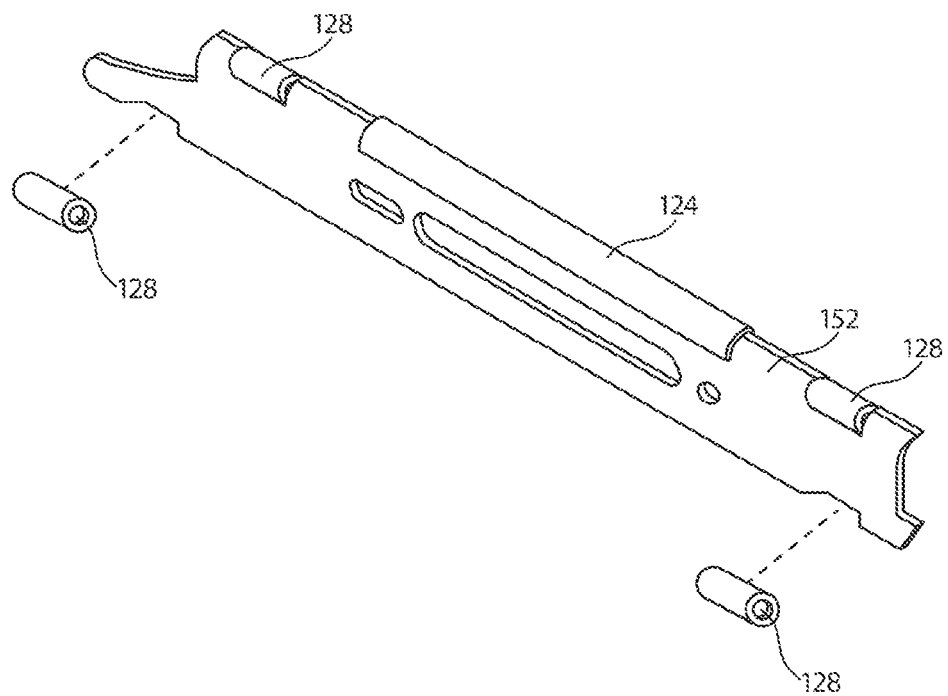
FIG. 10 includes a partially exploded perspective view of a support feature and slide pins in accordance with an alternate embodiment.
Figure 11:
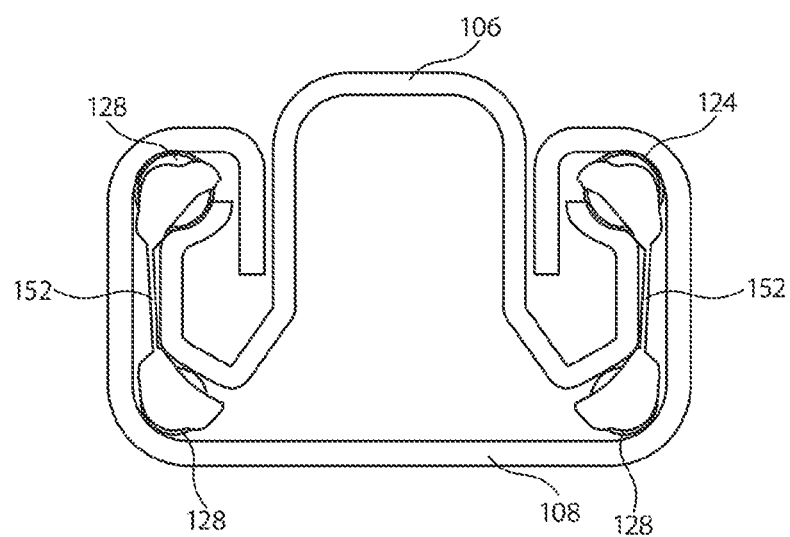
FIG. 11 includes a side elevation view of a rail of a seat track assembly in accordance with an embodiment.

Referring to FIGS. 10 and 11, in an embodiment the top row of the support frame 152 can include slide pins 128 and a structure 124. The bottom row can include either slide pins 128 alone or in combination with one or more structure 124. Referring to the top row, in a particular embodiment, the structure 124 may be disposed between two or more slide pins 128. The structure 124 may have a length greater than the length of the slide pins 128.

In an embodiment, the structure 124 disposed in the top row may have an outer diameter, as measured in the undeformed state, that is greater than the outer diameter of the slide pins 128 in the top row. In a further embodiment, the outer diameter of the structure 124, as measured in the undeformed state, may be greater than the gap distance between the receivers 106 and 108. The structures 124 in the top row of the frame 152 in FIG. 11 are illustrated exaggerated into the receivers 106 and 108 in an undeformed state, as they may appear prior to installation. Oversizing the structure 124 may allow for better tolerance and misalignment absorption between the receivers 106 and 108. This may reduce the occurrence of noise, vibration, and the transfer of harshness (NVH) within the seat track assembly, which may result in smoother and quieter passenger experience.

In an embodiment, the diameter of the structure 124, as measured in the undeformed state, can be at least 1.01 the diameter of at least one of the slide pins 128, such as at least 1.02 the diameter of at least one of the slide pins, at least 1.03 the diameter of at least one of the slide pins, at least 1.04 the diameter of at least one of the slide pins, at least 1.05 the diameter of at least one of the slide pins, at least 1.1 the diameter of at least one of the slide pins, or even at least 1.15 the diameter of at least one of the slide pins. In a more particular embodiment, the diameter of the structure 124, as measured in the undeformed state, can be at least 1.01 the diameter of all of the slide pins 128, such as at least 1.02 the diameter of all of the slide pins, at least 1.03 the diameter of all of the slide pins, at least 1.04 the diameter of all of the slide pins, at least 1.05 the diameter of all of the slide pins, at least 1.1 the diameter of all of the slide pins, or even at least 1.15 the diameter of all of the slide pins.

In a non-illustrated embodiment, a structure may be disposed along the bottom row of the frame 152. Similar to the structure 124 in the top row, utilization of a structure within the bottom row may further reduce NVH within the seat track assembly.

Skilled artisans will recognize after reading this description that while rail designs vary, it may be generally desirable to position load bearing sliding members 122 in certain positions within the rail and non-load bearing, tolerance compensating sliding members 122 in other positions within the rail. In such a manner, filled structures 124 or slide pins including rigid substrates may support vertical loads, while empty structures 124 may provide superior tolerance compensation.

Figure 12:
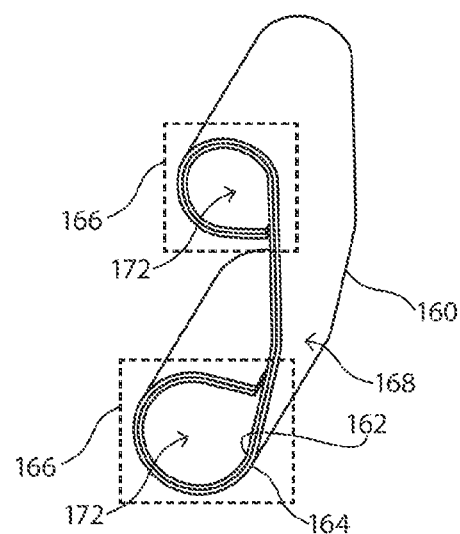
FIG. 12 includes a perspective view of a strip in accordance with an embodiment.

Referring now to FIG. 12, in another aspect, at least one of the sliding members 122 may be a composite strip 160 including a substrate 162 coupled to a low friction material 164. The low friction material 164 can include any of the above described low friction materials, including, for example, a fluoropolymer, such as a PTFE. The substrate 162 can include a rigid material, such as described above. For example, the substrate 162 can include a metal, an alloy, or a rigid polymer. In a particular embodiment, the substrate 162 can include a steel, such as spring steel.

In an embodiment, the low friction material 164 may be applied to the substrate 162, for example, by a lamination process or by the application of a heat, a pressure, welding, or an adhesive. In another embodiment, the low friction material 164 may be coated on the substrate 162, for example, by an extrusion or spray coating process.

The strip 160 can be machined after application of the low friction material 164, for example, by calendaring or pickling to affect a suitable surface finish. Other suitable processes can be utilized to achieve desired surface finish.

In a non-limiting embodiment, the strip 160 can include one or more corrugations, notches, grooves, slots, or other similar features extending therealong. These features may alter the stiffness profile of the strip 160. More specifically, these features may create localized points of increased or decreased stiffness, allowing for precise structural engineering of the strip 160. These features may also alter the tolerance compensation properties of the strip 160. More specifically, these features may create localized points of increased or decreased tolerance absorption capacity. In this regard, it may be possible to permit enhanced tolerance absorption along certain portions of the strip 160. It may be simultaneously possible to have stiffer portions of the strip 160 at other locations.

The strip 160 can include one or more ellipsoidal portions 166 as seen from a side view. In an embodiment, the ellipsoidal portions 166 can be formed by shaping portions of the strip 160. More particularly, the ellipsoidal portions 166 can be at least partially formed by folding an end of the strip 160 toward the opposing end thereof.

Prior to shaping, the strip 160 can initially comprise a flat strip of material defining a (first) major surface 168 and a (second) major surface spaced apart by a thickness. In an embodiment, prior to shaping, the major surfaces can extend along generally parallel planes. In a further embodiment, the strip 160 can have a uniform thickness as measured prior to shaping.

In an embodiment, prior to shaping, the strip 160 can define a first edge, a second edge, a third edge, and a fourth edge. In a more particular embodiment, the first and third edges can be disposed at opposite sides of the strip 160, and the second and fourth edges can be disposed at opposite sides of the strip 160. In another embodiment, the strip 160 can define more or less than four edges. For example, the strip 160 can define a triangle, a pentagon, a hexagon, a heptagon, an octagon, a nonagon, a decagon, or any other polygon having any number of additional edges. In a more particular embodiment, the strip 160 can have a generally rectangular shape. In this regard, the first and third edges can be parallel with one another and the second and fourth edges can be parallel with one another. Moreover, the first and third edges can be perpendicular to the second and fourth edges.

During shaping, the first edge of the strip 160 can be shaped toward the third edge. For example, the strip 160 can be folded, bent, or otherwise manipulated such that a distance between the first and third edges decreases at one or more locations therealong to form the ellipsoidal portion 166. In a particular embodiment, the first edge can be uniformly shaped toward the third edge, i.e., the ellipsoidal portion 166 has a uniform shape and size along a length of the first edge.

After shaping the first edge toward the third edge, the third edge of the strip 160 can be shaped toward the first edge. For example, the strip 160 can be folded, bent, or otherwise manipulated such that a distance between the third and first edges decreases.

The ellipsoidal portion(s) 166 of the strip 160 can each define one or more apertures 172. The apertures 172 can extend along a plane parallel with the length of the ellipsoidal portion 166.

As illustrated in FIG. 12, and in accordance with an embodiment, the apertures 172 can have different relative shapes and sizes with respect to each other. For example, the upper aperture 172 can have a smaller width than the lower aperture 172. Alternatively, the lower aperture 172 can have a smaller width than the upper aperture 172. Reference to spatial descriptions as used herein is with made respect to the orientation as illustrated in the figures.

Figure 13:
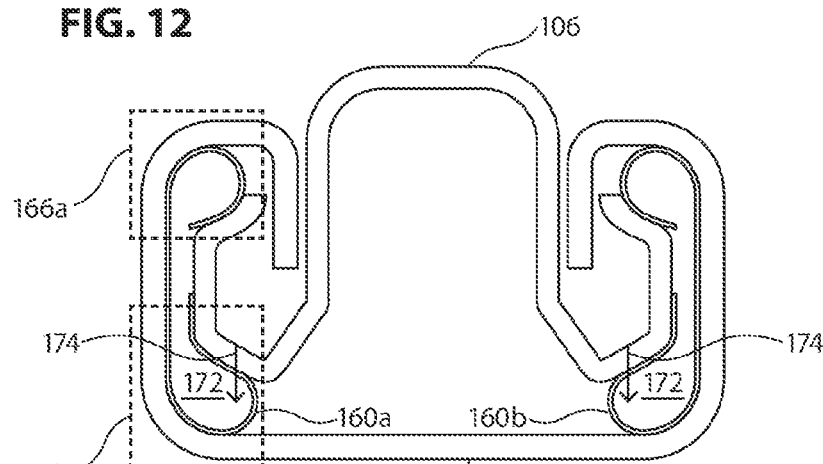
FIG. 13 includes a cross-sectional elevation view of a strip disposed in a rail of the seat track assembly in accordance with an embodiment.

The strip 160 may deform upon installation in the rail 102 or 104. For example, as illustrated in FIG. 13, the lower ellipsoidal portion 166b may press against itself and slide along the lower receiver 108. Application of a loading condition, e.g., weight of a passenger, in a vertical direction upon application of a vertical loading condition (as illustrated by lines 174) may deform the strip 160. In an embodiment, the ellipsoidal portion 166b may deform to match, or substantially match, the contact surfaces of the adjacent receiver 106 or 108.

After initial deformation is complete, e.g., the rail 102 is at equilibrium such that the strip 160 no longer deforms to the loading condition, the strip 160 may be considered "broken in." In this state, the strip 160 may be accurately, or nearly accurately, fit between the receivers 106 and 108.

In certain embodiments the upper ellipsoidal portion 166a may provide minimal vertical support between the receivers 106 and 108. Rather, the ellipsoidal portion 166a may provide tolerance compensation for absorbing acceptable manufacturing tolerances and misalignment within the receivers 106 and 108. Additionally, in particular embodiments, the upper ellipsoidal portion 166a may provide lateral stability and lateral tolerance compensation characteristics.

Each strip 160 can have a length. In some embodiments the length of the strip 160 may extend along at least a majority of the length of the rail 102. For example, the strip 160 may extend at least 55% of the length of the rail 102, such as at least 60% of the rail, at least 65% of the rail, at least 70% of the rail, at least 75% of the rail, at least 80% of the rail, at least 85% of the rail, or even at least 90% of the rail. In such embodiments, it may be possible to utilize a single strip 160 on opposite lateral side of the receiver 106. In other embodiments, it may be desirable to utilize two or more strips 160 disposed on opposite lateral side of the receiver 106. In such a manner, each strip 160 can be made suitable for the loading condition exhibited at a particular location within the rails 102. In a particular embodiment, the multiple strips 160 on each opposite lateral side of the receiver 106 may be interconnected with one another. For example, a connection portion (not illustrated) may extend between the lower ends of laterally opposite strips 160. The connection portion may extend between the ellipsoidal portions 166b. Alternatively, the ellipsoidal portions 166b may be omitted. A single strip of material may extend between laterally opposite ellipsoidal portions 166a and 166a. In a particular embodiment having multiple strips 160, the multiple strips 160 can freely translate independent of one another.

Figure 14:
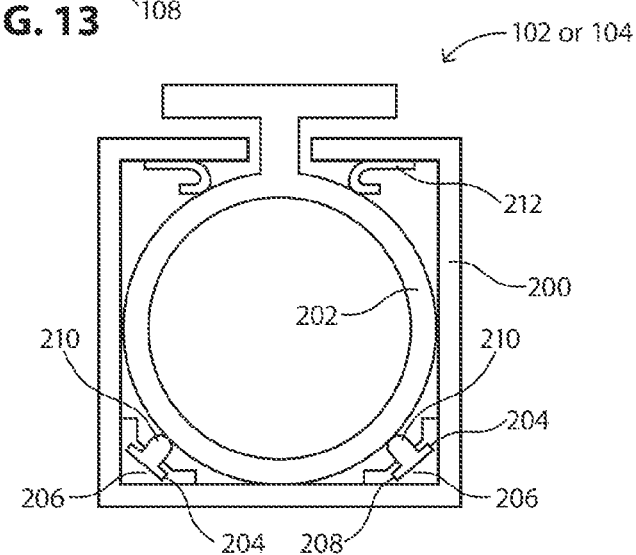
FIG. 14 includes a cross-sectional elevation view of a rail assembly of a seat track assembly in accordance with an embodiment.
Figure 15:
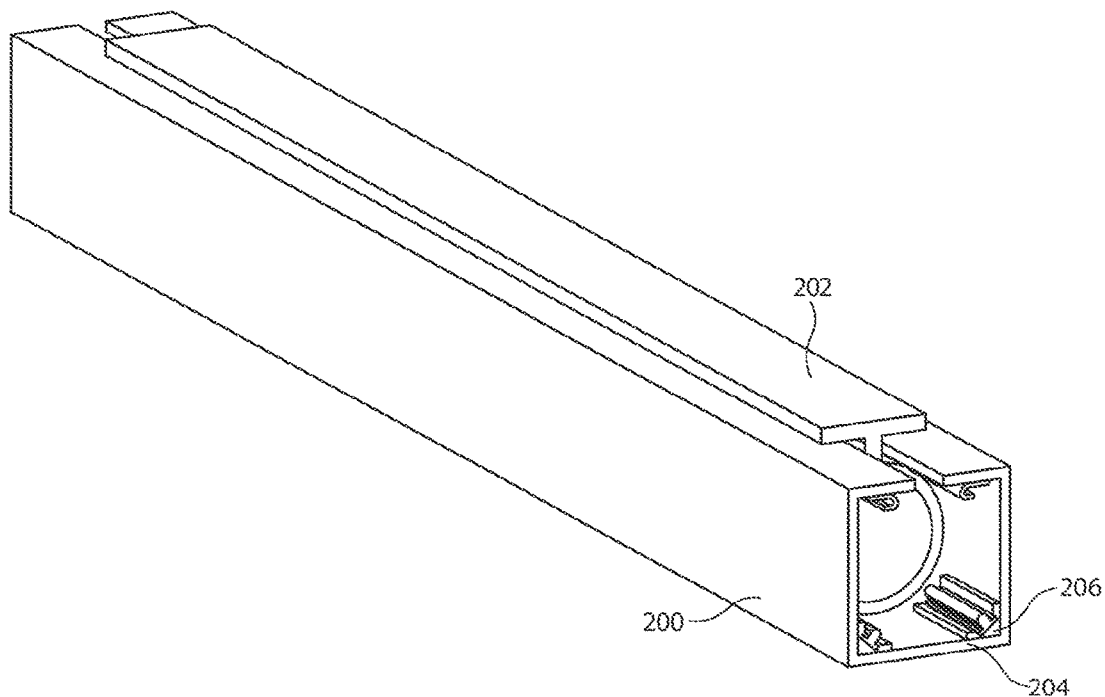
FIG. 15 includes a top perspective top view of a rail assembly of a seat track assembly in accordance with an embodiment.

Referring now to FIGS. 14 and 15, in another aspect, at least one of the rails 102 and 104 may include an outer receiver 200, an inner receiver 202 at least partially inscribed within the outer receiver 200, and one or more sliding bars 204 disposed therebetween.

In a particular embodiment, at least one of the sliding bars 204 may be similar to the structures in FIGS. 3a to 3j. In another embodiment, at least one of the sliding bars 204 may include a generally bullet shaped projection extending radially between the receivers 200 and 202. In a particular embodiment, at least two of the sliding bars 204 may have the same geometric configuration with respect to each other. In a further embodiment, all of the sliding bars 204 may have the same geometric configuration with respect to each other. In another embodiment, at least two of the sliding bars 204 may have different geometric configurations with respect to each other.

In an embodiment, at least one of the sliding bars 204 may be disposed within a support component 206 to maintain proper positioning and orientation with respect to the receivers 200 and 202. The support component 206 may be coupled to one of the receivers 200 or 202, for example, by an adhesive, a mechanical engagement, a threaded or non-threaded fastener, or any other suitable engagement.

In an embodiment, at least one of the sliding bars 204 may extend along at least a majority of the length of the rail 102. For example, the at least one sliding bar 204 may extend at least 55% of the length of the rail 102, such as at least 60% of the rail, at least 65% of the rail, at least 70% of the rail, at least 75% of the rail, at least 80% of the rail, at least 85% of the rail, or even at least 90% of the rail. In another embodiment, the at least one sliding bar 204 may extend less than 20% of the length of the rail 102, such as less than 15%, of the rail, less than 10% of the rail, less than 5% of the rail, or even less than 1% of the rail.

In an embodiment, a plurality of sliding bars 204 may be interspaced along the length of the rail 102. In such a manner, frictional buildup along an interface between the sliding bars 204 and the receivers 200 and 202 may be reduced. In an embodiment, there may be at least four sliding bars 204 disposed within the rail 102, such as at least 6 sliding bars, at least 8 sliding bars, at least 10 sliding bars, or even at least 12 sliding bars. In a further embodiment, there can be no greater than 100 sliding bars disposed within the rail 102, such as no greater than 75 sliding bars, no greater than 50 sliding bars, or even no greater than 20 sliding bars.

In an embodiment, at least one of the sliding bars 204 may engage with at least one of the support components 206 by way of a complementary engagement interface 208, such as, for example, a tongue and groove arrangement. In an embodiment, one of the sliding bar 204 or support component 206 can include a recess and the other can include a projection adapted to extend into and secure within the recess. In a further embodiment, the recess may further include flanged, recessed portions extending therefrom. The projection can include flanged extensions adapted to extend into and secure within the flanged, recessed portions of the recess. This may resemble, for example, a T-shape or a Y-shape. In certain embodiments, engagement of the complementary engagement interface 208 may be performed by longitudinally translating one or both of the sliding bar 204 and support component 206 relative to one another.

In an embodiment, the sliding bar 204 may be further secured to the support component 206 by an adhesive, a threaded or non-threaded fastener, or by a suitable mechanical engagement device, such as for example, a clip or detent.

The sliding bar 204 may contact the receiver 202 along a contact interface 210. In an embodiment, the contact interface 210 can be a line, or nearly a line, contact extending along at least a portion of the length of the sliding bar 204. In another embodiment, the contact interface 210 can include an area contact, e.g., contact having a length and a width.

In an embodiment, the sliding bar 204 can include a fluoropolymer, such as a polytetrafluoroethylene (PTFE). Other exemplary fluoropolymers can include a fluorinated ethylene propylene (FEP), a polyvinylidene fluoride (PVDF), a perfluoroalkoxy (PFA), a terpolymer of tetrafluoroethylene, a hexafluoropropylene and vinylidene fluoride (THV), a polychlorotrifluoroethylene (PCTFE), an ethylene tetrafluoroethylene copolymer (ETFE), an ethylene chlorotrifluoroethylene copolymer (ECTFE), or any combination thereof. Additionally, it is possible to use other sliding materials, such as for example, those marketed by the applicant under the trademark Norglide®. In another embodiment, the sliding bar 204 can include a polyimide, such as for example, those marketed by the applicant under the trademark Meldin® 2000, 7000, 8100, or 9000, or a thermoplastic, such as for example, those marketed by the Applicant under the trademark Meldin® 1000, 3100, or 5000.

The support component(s) 206 can include a rigid material, such as, for example, a metal, an alloy, or a rigid polymer. The support component(s) 206 can include a solid construction. In an embodiment, the support component 206 can include one or more apertures (not illustrated) adapted to absorb a tolerance or misalignment between the receivers 200 and 202. In an embodiment, the support component 206 can be monolithic, e.g., the support component 206 includes a uniform construction.

In certain embodiments, the rail 102 may further include one or more tolerance absorption elements 212 disposed between the receivers 200 and 202. In an embodiment, each of the tolerance absorption elements 212 may be disposed diametrically opposite one of the sliding bars 204.

The tolerance absorption elements 212 can absorb a tolerance between the receivers 200 and 202. The tolerance absorption elements 212 may include a bent strip having a geometric tolerance capacity. The tolerance absorption elements 212 may provide a spring force between the receivers 200 and 202, urging the receivers 200 and 202 apart.

In an embodiment, the tolerance absorption element 212 can provide minimal vertical support to the rail 102. Instead, the tolerance absorption element 212 may permit a zero clearance fit between the receivers 200 and 202.

In accordance with one or more embodiments described herein, it may be possible to obtain a relatively uniform sliding force in the rails over a range of misalignments and tolerance variations in the receiver design and orientation.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1. A seat track assembly comprising:
a first rail and a second rail spaced apart by a distance and extending parallel with respect to one another, wherein at least one of the first and second rails comprises:
a first receiver;
a second receiver, the first and second receivers longitudinally translatable with respect to each other; and
a sliding member disposed therebetween, wherein the sliding member comprises a low friction material and has an aperture extending at least partially therethrough.

Embodiment 2. A seat track assembly comprising:
a first rail and a second rail spaced apart by a distance and extending parallel with respect to one another, wherein at least one of the first and second rails comprises:
a first receiver;
a second receiver, the first and second receivers longitudinally translatable with respect to each other; and
a sliding member disposed therebetween,
wherein a maximum force to affect longitudinal translation of the first and second receivers with respect to each other has a standard deviation of no greater than 30 N, no greater than 25 N, no greater than 20 N, no greater than 15 N, no greater than 10 N, no greater than 9 N, no greater than 8 N, no greater than 7 N, no greater than 6 N, no greater than 5 N, or even no greater than 4 N, at a misalignment specification of 0.6 mm.

Embodiment 3. A sliding member for a seat track assembly comprising:
a body including:
a low friction material; and
an aperture extending along at least a portion of the body.

Embodiment 4. The seat track assembly according to embodiment 2, wherein the sliding member comprises a low friction material.

Embodiment 5. The seat track assembly or sliding member according to any one of embodiments 1, 3 and 4, wherein the low friction material includes a polymer.

Embodiment 6. The seat track assembly or sliding member according to any one of embodiments 1 and 3-5, wherein the low friction material includes a fluoropolymer.

Embodiment 7. The seat track assembly or sliding member according to any one of embodiments 1 and 3-6, wherein the low friction material includes a PTFE.

Embodiment 8. The seat track assembly or sliding member according to any one of the preceding embodiments, wherein the sliding member further comprises a substrate.

Embodiment 9. The seat track assembly or sliding member according to embodiment 8, wherein the substrate is disposed radially inside of at least a portion of the low friction material.

Embodiment 10. The seat track assembly or sliding member according to any one of embodiments 8 and 9, wherein the substrate is disposed radially inside of the entire low friction material.

Embodiment 11. The seat track assembly or sliding member according to any one of embodiments 8-10, wherein the substrate at least partially comprises a metal.

Embodiment 12. The seat track assembly or sliding member according to any one of the preceding embodiments, wherein the substrate at least partially comprises a polymer.

Embodiment 13. The seat track assembly or sliding member according to any one of the preceding embodiments, wherein the sliding member is adapted to operate without an external lubricant.

Embodiment 14. The seat track assembly or sliding member according to any one of the preceding embodiments, wherein the sliding member is greaseless such that it is adapted to operate without an external grease.

Embodiment 15. The seat track assembly or sliding member according to any one of the preceding embodiments, wherein the sliding member has a length, a width, and a height, and wherein the length is different from the width and the height.

Embodiment 16. The seat track assembly or sliding member according to embodiment 15, wherein the length is greater than the width, and wherein the length is greater than the height.

Embodiment 17. The seat track assembly or sliding member according to any one of the preceding embodiments, wherein the seat track assembly is adapted to longitudinally translate upon application of a longitudinally oriented force of no greater than 100 N, no greater than 75 N, no greater than 60 N, no greater than 45 N, no greater than 40 N, no greater than 35 N, no greater than 30 N, no greater than 29 N, no greater than 28 N, no greater than 27 N, no greater than 26 N, no greater than 25 N, no greater than 24 N, no greater than 23 N, no greater than 22 N, no greater than 21 N, no greater than 20 N, no greater than 19 N, no greater than 18 N, no greater than 17 N, no greater than 16 N, or even no greater than 15 N.

Embodiment 18. The seat track assembly or sliding member according to any one of the preceding embodiments, wherein the seat track assembly is adapted to longitudinally translate upon application of a longitudinally oriented force of at least 0.1 N, such as at least 1 N, or even at least 5 N.

Embodiment 19. The seat track assembly or sliding member according to any one of embodiments 1 and 3-18, wherein a maximum force to affect longitudinal translation of the first and second receivers with respect to each other has a standard deviation of no greater than 10 N, such as no greater than 9 N, no greater than 8 N, no greater than 7 N, no greater than 6 N, no greater than 5 N, or even no greater than 4 N, as measured over a misalignment between the first and second receivers of 0.6 mm or less.

Embodiment 20. The seat track assembly or sliding member according to any one of the preceding embodiments, wherein the maximum force to affect longitudinal translation of the first and second receivers with respect to each other has a standard deviation of at least 0.01 N, such as at least 0.1 N, or even at least 1 N, as measured over a misalignment between the first and second receivers of 0.6 mm or less.

Embodiment 21. The seat track assembly or sliding member according to any one of embodiments 2 and 4-20, wherein the sliding member further comprises an aperture extending at least partially therethrough.

Embodiment 22. The seat track assembly or sliding member according to any one of embodiments 1 and 3-21, wherein the sliding member has a length, L, and wherein the aperture extends at least 0.05 L, such as at least 0.1 L, at least 0.2 L, at least 0.3 L, at least 0.4 L, at least 0.5 L, at least 0.6 L, at least 0.7 L, at least 0.8 L, or even at least 0.9 L.

Embodiment 23. The seat track assembly or sliding member according to any one of embodiments 1 and 3-22, wherein the aperture extends through the entire length of the sliding member.

Embodiment 24. The seat track assembly or sliding member according to any one of embodiments 1 and 3-23, wherein the aperture defines a width, wherein the sliding member defines a width, and wherein the width of the sliding member is greater than the width of the aperture.

Embodiment 25. The seat track assembly or sliding member according to any one of embodiments 1 and 3-24, wherein the sliding member defines a width that is at least 101% a width of the aperture, such as at least 102%, at least 103%, at least 104%, at least 105%, at least 110%, at least 115%, at least 120%, at least 125%, at least 130%, at least 135%, at least 140%, at least 150%, at least 160%, at least 170%, at least 180%, at least 190%, or even at least 200%.

Embodiment 26. The seat track assembly or sliding member according to any one of embodiments 1 and 3-25, wherein the sliding member defines a width that is no greater than 1000% a width of the aperture, such as no greater than 900%, no greater than 800%, no greater than 700%, no greater than 600%, no greater than 500%, no greater than 400%, no greater than 300%, or even no greater than 225%.

Embodiment 27. The seat track assembly or sliding member according to any one of the preceding embodiments, wherein the sliding member has an average wall thickness of at least 0.1 mm, such as at least 0.2 mm, at least 0.3 mm, at least 0.4 mm, or even at least 0.5 mm.

Embodiment 28. The seat track assembly or sliding member according to any one of the preceding embodiments, wherein the sliding member has an average wall thickness of no greater than 10 mm, such as no greater than 5 mm, or even no greater than 1 mm.

Embodiment 29. The seat track assembly or sliding member according to any one of embodiments 1 and 3-28, wherein the aperture has a diameter of at least 0.1 mm, such as at least 0.2 mm, at least 0.3 mm, at least 0.4 mm, at least 0.5 mm, at least 1 mm, at least 2 mm, at least 3 mm, at least 4 mm, or even at least 5 mm.

Embodiment 30. The seat track assembly or sliding member according to any one of embodiments 1 and 3-29, wherein the aperture has a diameter of no greater than 15 mm, such as no greater than 10 mm.

Embodiment 31. The seat track assembly or sliding member according to any one of embodiments 1 and 3-30, wherein the aperture has an at least partially ellipsoidal cross section.

Embodiment 32. The seat track assembly or sliding member according to any one of embodiments 1 and 3-31, wherein the aperture has an at least partially circular or ovular shape.

Embodiment 33. The seat track assembly or sliding member according to any one of embodiments 1 and 3-32, wherein the aperture has an at least partially polygonal cross section.

Embodiment 34. The seat track assembly or sliding member according to any one of embodiments 1 and 3-33, wherein the aperture defines s shape selected from: a triangle, a quadrilateral, a pentagon, a hexagon, a heptagon, an octagon, a nonagon, a decagon, a hendecagon, or a dodecagon.

Embodiment 35. The seat track assembly or sliding member according to any one of embodiments 1 and 3-34, wherein the aperture comprises a plurality of apertures.

Embodiment 36. The seat track assembly or sliding member according to embodiment 35, wherein at least two apertures of the plurality of apertures extend in parallel with respect to each other.

Embodiment 37. The seat track assembly or sliding member according to any one of embodiments 35 and 36, wherein at least two apertures of the plurality of apertures extend in a non-parallel orientation with respect to each other.

Embodiment 38. The seat track assembly or sliding member according to any one of embodiments 35-37, wherein at least two apertures have a same diameter with respect to each other.

Embodiment 39. The seat track assembly or sliding member according to any one of embodiments 35-38, wherein at least two apertures have a different diameter with respect to each other.

Embodiment 40. The seat track assembly or sliding member according to any one of embodiments 35-39, wherein at least one of the apertures has an ellipsoidal cross section.

Embodiment 41. The seat track assembly or sliding member according to any one of embodiments 35-40, wherein at least one of the apertures have a polygonal cross section.

Embodiment 42. The seat track assembly or sliding member according to any one of embodiments 35-41, wherein the aperture defines a shape selected from: a triangle, a quadrilateral, a pentagon, a hexagon, a heptagon, an octagon, a nonagon, a decagon, a hendecagon, or a dodecagon.

Embodiment 43. The seat track assembly or sliding member according to any one of embodiments 35-42, wherein at least two apertures have a same length with respect to each other.

Embodiment 44. The seat track assembly or sliding member according to any one of embodiments 35-43, wherein at least two apertures have a different length with respect to each other.

Embodiment 45. The seat track assembly or sliding member according to any one of embodiments 35-44, wherein the apertures are equally spaced apart along the cross-sectional area of the sliding member.

Embodiment 46. The seat track assembly or sliding member according to any one of embodiments 35-44, wherein the apertures are not equidistance along the cross-sectional area of the sliding member.

Embodiment 47. The seat track assembly or sliding member according to any one of embodiments 35-46, wherein at least two apertures are reflectively symmetrical about a plane.

Embodiment 48. The seat track assembly or sliding member according to any one of embodiments 35-47, wherein at least two apertures are rotationally symmetrical about a point.

Embodiment 49. The seat track assembly or sliding member according to any one of embodiments 35-48, wherein at least one aperture is open.

Embodiment 50. The seat track assembly or sliding member according to any one of embodiments 35-49, wherein at least one aperture is at least partially filled.

Embodiment 51. The seat track assembly or sliding member according to any one of embodiments 35-50, wherein at least one aperture is at least partially filled with a polymer.

Embodiment 52. The seat track assembly or sliding member according to any one of embodiments 35-51, wherein at least one aperture is at least partially filled with a metal or an alloy.

Embodiment 53. The seat track assembly or sliding member according to any one of embodiments 1 and 3-52, wherein the aperture has a closed periphery.

Embodiment 54. The seat track assembly or sliding member according to any one of embodiments 1 and 3-52, wherein the aperture has an open periphery such that a gap exists at a location along a circumference of the aperture.

Embodiment 55. The seat track assembly or sliding member according to any one of embodiments 1 and 3-54, wherein the aperture is open.

Embodiment 56. The seat track assembly or sliding member according to any one of embodiments 1 and 3-55, wherein the aperture is at least partially filled.

Embodiment 57. The seat track assembly or sliding member according to any one of embodiments 1 and 3-56, wherein the aperture is at least partially filled with a polymer.

Embodiment 58. The seat track assembly or sliding member according to any one of embodiments 1 and 3-57, wherein the aperture is at least partially filled with a metal or an alloy.

Embodiment 59. The seat track assembly or sliding member according to any one of embodiments 1 and 3-58, wherein at least 10% of the aperture is filled, such as at least 15%, at least 20%, at least 25%, at least 30%, at least 35%, at least 40%, at least 45%, at least 50%, at least 55%, at least 60%, at least 65%, at least 70%, or even at least 75%.

Embodiment 60. The seat track assembly or sliding member according to any one of embodiments 1 and 3-59, wherein no greater than 100% of the aperture is filled, such as less than 99%, less than 98%, less than 97%, less than 96%, less than 95%, less than 90%, less than 85%, or even less than 80%.

Embodiment 61. The seat track assembly or sliding member according to any one of embodiments 1 and 3-60, wherein, prior to installation in the seat track assembly, the sliding member further comprises a void disposed between at least a portion of the low friction material and a substrate disposed therein.

Embodiment 62. The seat track assembly or sliding member according to embodiment 61, wherein the void is reduced in size after installation in the seat track assembly.

Embodiment 63. The seat track assembly or sliding member according to embodiment 62, wherein the void is reduced by at least 10%, such as by at least 20%, at least 30%, at least 40%, at least 50%, at least 60%, at least 70%, at least 80%, at least 90%, or even 100%.

Embodiment 64. A sliding member for a seat track assembly comprising:
  a sidewall having a length and defining an aperture extending along at least a portion of the length.

Embodiment 65. A preassembly for a seat track assembly comprising:
  a support feature having an opening; and
  a sliding member disposed in the opening, the sliding member comprising a sidewall having a length and defining an aperture extending along at least a portion of the length.

Embodiment 66. A seat track assembly comprising:
  a first receiver;

a second receiver, the first and second receivers being longitudinally translatable with respect to each other; and a sliding member disposed between the first and second receivers, the sliding member comprising a sidewall having a length and defining an aperture extending along at least a portion of the length.

Embodiment 67. The sliding member, preassembly, or seat track assembly according to any one of embodiments 64-66, wherein the aperture extends along the entire length of the sidewall.

Embodiment 68. The sliding member, preassembly, or seat track assembly according to any one of embodiments 64-67, wherein the sliding member has a barrel shape.

Embodiment 69. The sliding member, preassembly, or seat track assembly according to any one of embodiments 64-68, wherein the sliding member comprises a first and a second opposite terminal ends and a middle portion disposed therebetween, and wherein a diameter of the middle portion is greater than a diameter of at least one of the first and second opposite terminal ends.

Embodiment 70. The sliding member, preassembly, or seat track assembly according to embodiment 69, wherein the diameter of the middle portion is at least 101% the diameter of the end portion, such as at least 102%, at least 103%, at least 104%, at least 105%, at least 110%, at least 115%, at least 120%, at least 125%, at least 130%, at least 135%, at least 140%, at least 145%, or even at least 150%.

Embodiment 71. The sliding member, preassembly, or seat track assembly according to any one of embodiments 69 and 70, wherein the diameter of the middle portion is no greater than 250% the diameter of the end portion, such as no greater than 200%, or even no greater than 175%.

Embodiment 72. The sliding member, preassembly, or seat track assembly according to any one of embodiments 64-71, further comprising a gap extending along the sidewall between first and second opposite terminal ends thereof.

Embodiment 73. The sliding member, preassembly, or seat track assembly according to embodiment 72, wherein the gap extends entirely between the first and second opposite terminal ends.

Embodiment 74. The sliding member, preassembly, or seat track assembly according to any one of embodiments 64-73, wherein the sidewall tapers along at least one axial end thereof.

Embodiment 75. The sliding member, preassembly, or seat track assembly according to any one of embodiments 64-74, wherein the sidewall has a guide portion along at least one terminal end thereof.

Embodiment 76. The sliding member, preassembly, or seat track assembly according to any one of embodiments 64-75, wherein the sidewall is monolithic.

Embodiment 77. The sliding member, preassembly, or seat track assembly according to any one of embodiments 64-76, wherein the sidewall has a wall thickness of at least 0.05 mm, such as at least 0.1 mm, at least 0.2 mm, at least 0.3 mm, at least 0.4 mm, or even at least 0.5 mm.

Embodiment 78. The sliding member, preassembly, or seat track assembly according to any one of embodiments 64-77, wherein the sidewall has a wall thickness of no greater than 10 mm, such as no greater than 9 mm, no greater than 8 mm, no greater than 7 mm, no greater than 6 mm, or even no greater than 5 mm.

Embodiment 79. The sliding member, preassembly, or seat track assembly according to any one of embodiments 64-78, further comprising a substrate disposed within the aperture of the sidewall.

Embodiment 80. The sliding member, preassembly, or seat track assembly according to embodiment 79, wherein the substrate fills an entire volume of the aperture.

Embodiment 81. The sliding member, preassembly, or seat track assembly according to embodiment 79, wherein a void is disposed between the substrate and the sidewall, as seen prior to installation in the seat track assembly.

Embodiment 82. The sliding member, preassembly, or seat track assembly according to embodiment 81, wherein the void is centrally disposed along a length of the sidewall.

Embodiment 83. The sliding member, preassembly, or seat track assembly according to embodiment 81, wherein the void is disposed a distance from a central point of the sidewall.

Embodiment 84. The sliding member, preassembly, or seat track assembly according to any one of embodiments 81-83, wherein the void is reduced in size upon installation of the sliding member in the seat track assembly.

Embodiment 85. The sliding member, preassembly, or seat track assembly according to any one of embodiments 79-84, wherein the substrate comprises a resilient material.

Embodiment 86. The sliding member, preassembly, or seat track assembly according to any one of embodiments 79-85, wherein the substrate comprises a rigid material.

Embodiment 87. The sliding member, preassembly, or seat track assembly according to any one of embodiments 79-86, wherein the substrate at least partially comprises a metal or a metal alloy.

Embodiment 88. The sliding member, preassembly, or seat track assembly according to any one of embodiments 79-87, wherein the substrate at least partially comprises a polymer.

Embodiment 82. The sliding member, preassembly, or seat track assembly according to any one of embodiments 79-89, wherein the substrate is monolithic.

Embodiment 90. The sliding member, preassembly, or seat track assembly according to any one of embodiments 79-89, wherein the substrate has an hour glass shape, when viewed from a side view.

Embodiment 91. The sliding member, preassembly, or seat track assembly according to any one of embodiments 79-90, wherein the substrate has an average thickness that is greater than a wall thickness of the sidewall.

Embodiment 92. The sliding member, preassembly, or seat track assembly according to any one of embodiments 64-91, wherein the sliding component defines a maximum diameter, $D_{MAX}$, as measured prior to assembly and a length, L, and wherein L is at least 1.5 $D_{MAX}$, such as at least 1.75 $D_{MAX}$, at least 2.0 $D_{MAX}$, at least 2.25 $D_{MAX}$, at least 2.5 $D_{MAX}$, at least 2.75 $D_{MAX}$, at least 3.0 $D_{MAX}$, at least 3.25 $D_{MAX}$, at least 3.5 $D_{MAX}$, at least 3.75 $D_{MAX}$, or even at least 4.0 $D_{MAX}$.

Embodiment 93. The sliding member, preassembly, or seat track assembly according to any one of embodiments 64-92, wherein the sidewall has a maximum diameter, $D_{MAX}$, as measured prior to installation, wherein the sidewall has a minimum functional diameter, $D_{MIN}$, as measured after installation, and wherein $D_{MAX}/D_{MIN}$ is at least 1.001, such as at least 1.01, at least 1.02, at least 1.03, at least 1.04, at least 1.05, or even at least 1.06.

Embodiment 94. The sliding member, preassembly, or seat track assembly according to any one of embodiments 64-93, wherein the sidewall has a maximum diameter, $D_{MAX}$, as measured prior to installation, wherein the sidewall has a minimum functional diameter, $D_{MIN}$, as measured after installation, and wherein $D_{MAX}/D_{MIN}$ is no greater than 1.5, such as no greater than 1.4, no greater than 1.3, no greater than 1.2, or even no greater than 1.1.

Embodiment 95. The sliding member, preassembly, or seat track assembly according to any one of embodiments 64-94, wherein the sliding component is adapted to deflect up to 0.33 mm, as measured in a direction perpendicular to the length of the sidewall.

Embodiment 96. The sliding member, preassembly, or seat track assembly according to any one of embodiments 64-95, wherein the sidewall comprises a low friction material.

Embodiment 97. The sliding member, preassembly, or seat track assembly according to embodiment 96, wherein the sidewall comprises a polymer.

Embodiment 98. The seat track assembly or sliding member according to any one of embodiments 96 and 97, wherein the sidewall comprises a fluoropolymer.

Embodiment 99. The seat track assembly or sliding member according to any one of embodiments 96-98, wherein the sidewall comprises a PTFE.

Embodiment 100. A sliding member for a seat track assembly comprising:
a composite strip having a first and a second opposite major surfaces spaced apart by a thickness, wherein the composite strip is shaped such that a maximum thickness thereof is measured between the first major surface at a first location and the first major surface at a second location.

Embodiment 101. A sliding member for a seat track assembly comprising:
a substrate having a first and a second opposite major surfaces spaced apart by a thickness; and
a low friction material coupled to the first major surface of the substrate,
wherein the first major surface lies along a first plane at a first location, wherein the first major surface lies along a second plane at a second location, and wherein the first and second planes intersect.

Embodiment 102. A seat track assembly comprising:
a first receiver;
a second receiver, the first and second receivers being longitudinally translatable with respect to each other; and
a sliding member disposed between the first and second receivers, the sliding member comprising:
a substrate having a first and a second opposite major surfaces spaced apart by a thickness; and
a low friction material coupled to the first major surface of the substrate,
wherein the first major surface lies along a first plane at a first location, wherein the first major surface lies along a second plane at a second location, and wherein the first and second planes intersect.

Embodiment 103. The sliding member according to embodiment 100, wherein the composite strip comprises a low friction material coupled to a substrate.

Embodiment 104. The sliding member or seat track assembly according to any one of embodiments 101-103, wherein the low friction material comprises a polymer, such as a fluoropolymer, such as a PTFE.

Embodiment 105. The sliding member or seat track assembly according to any one of embodiments 101-104, wherein the substrate comprises a rigid material.

Embodiment 106. The sliding member or seat track assembly according to any one of embodiments 101-105, wherein the substrate at least partially comprises a metal.

Embodiment 107. The sliding member or seat track assembly according to any one of embodiments 101-106, wherein the substrate at least partially comprises an alloy.

Embodiment 108. The sliding member or seat track assembly according to any one of embodiments 101-107, wherein the substrate at least partially comprises a polymer.

Embodiment 109. The sliding member or seat track assembly according to any one of embodiments 101-108, wherein at least a portion of the first major surface is defined by the low friction material.

Embodiment 110. The sliding member or seat track assembly according to any one of embodiments 101-109, wherein at least 25% of the first major surface is defined by the low friction material, such as at least 30% is defined by the low friction material, at least 35% is defined by the low friction material, at least 40% is defined by the low friction material, at least 45% is defined by the low friction material, at least 50% is defined by the low friction material, at least 55% is defined by the low friction material, at least 60% is defined by the low friction material, at least 65% is defined by the low friction material, at least 70% is defined by the low friction material, at least 75% is defined by the low friction material, at least 80% is defined by the low friction material, at least 85% is defined by the low friction material, or even at least 90% is defined by the low friction material.

Embodiment 111. The sliding member or seat track assembly according to any one of embodiments 101-110, wherein the entire first major surface is defined by the low friction material.

Embodiment 112. The sliding member or seat track assembly according to any one of embodiments 101-111, wherein at least a portion of the second major surface is defined by the substrate.

Embodiment 113. The sliding member or seat track assembly according to any one of embodiments 101-112, wherein at least 25% of the second major surface is defined by the substrate, such as at least 30% of the second major surface is defined by the substrate, at least 35% of the second major surface is defined by the substrate, at least 40% of the second major surface is defined by the substrate, at least 45% of the second major surface is defined by the substrate, at least 50% of the second major surface is defined by the substrate, at least 55% of the second major surface is defined by the substrate, at least 60% of the second major surface is defined by the substrate, at least 65% of the second major surface is defined by the substrate, at least 70% of the second major surface is defined by the substrate, at least 75% of the second major surface is defined by the substrate, at least 80% of the second major surface is defined by the substrate, at least 85% of the second major surface is defined by the substrate, or even at least 90% of the second major surface is defined by the substrate.

Embodiment 114. The sliding member or seat track assembly according to any one of embodiments 101-113, wherein the entire second major surfaces is defined by the substrate.

Embodiment 115. The sliding member or seat track assembly according to any one of embodiments 101-114, wherein the sliding member defines a first ellipsoidal portion, the first ellipsoidal portion defining an aperture.

Embodiment 116. The sliding member or seat track assembly according to embodiment 115, wherein the aperture has a closed periphery.

Embodiment 117. The sliding member or seat track assembly according to embodiment 115, wherein the aperture includes a gap such that the aperture has an open periphery.

Embodiment 118. The sliding member or seat track assembly according to any one of embodiments 115-117, wherein the aperture defines a generally ellipsoidal portion prior to insertion of the sliding member between the receivers.

Embodiment 119. The sliding member or seat track assembly according to any one of embodiments 115-118, wherein the aperture defines a generally polygonal portion prior to installation of the sliding member between the receivers.

Embodiment 120. The sliding member or seat track assembly according to any one of embodiments 115-119, wherein the aperture has a first shape prior to installation and a second shape after installation, and wherein the first shape is different from the second shape.

Embodiment 121. The sliding member or seat track assembly according to any one of embodiments 115-120, wherein the first ellipsoidal portion is plastically deformed upon installation.

Embodiment 122. The sliding member or seat track assembly according to any one of embodiments 115-120, further comprising a second ellipsoidal portion, the second ellipsoidal portion defining an aperture.

Embodiment 123. The sliding member or seat track assembly according to embodiment 122, wherein the second ellipsoidal portion is spaced apart from the first ellipsoidal portion.

Embodiment 124. The sliding member or seat track assembly according to any one of embodiments 122 and 123, wherein the first and second ellipsoidal portions are disposed on opposite sides of the sliding member.

Embodiment 125. The sliding member or seat track assembly according to any one of embodiments 122-124, wherein the aperture of the second ellipsoidal portion has a closed periphery.

Embodiment 126. The sliding member or seat track assembly according to any one of embodiments 122-124, wherein the aperture of the second ellipsoidal portion defines a gap such that the aperture of the second ellipsoidal portion has an open periphery.

Embodiment 127. The sliding member or seat track assembly according to any one of embodiments 122-126, wherein the aperture of the second ellipsoidal portion defines a generally polygonal portion prior to installation of the sliding member between the receivers.

Embodiment 128. The sliding member or seat track assembly according to any one of embodiments 122-127, wherein the aperture of the second ellipsoidal portion defines a generally polygonal portion prior to installation of the sliding member between the receivers.

Embodiment 129. The sliding member or seat track assembly according to any one of embodiments 122-128, wherein the aperture of the second ellipsoidal portion has a first shape prior to installation and a second shape after installation, and wherein the first shape is different from the second shape.

Embodiment 130. The sliding member or seat track assembly according to any one of embodiments 122-129, wherein the aperture of the first ellipsoidal portion has a different shape as compared to the aperture of the second ellipsoidal portion.

Embodiment 131. The sliding member or seat track assembly according to any one of embodiments 122-130, wherein the aperture of the first ellipsoidal portion has a different size than the aperture of the second ellipsoidal portion.

Embodiment 132. The sliding member or seat track assembly according to any one of embodiments 101-131, wherein the substrate is adhered to the low friction material.

Embodiment 133. The sliding member or seat track assembly according to any one of embodiments 101-132, further comprising an intermediary layer disposed between the substrate and the low friction material.

Embodiment 134. A seat track assembly comprising:
  a first receiver defining an opening extending along a length thereof;
  a second receiver disposed within the opening, the first and second receivers longitudinally translatable with respect to one another; and
  a plurality of sliding bars disposed between the first and second receivers, each of the sliding bars secured to the first receiver and including a low friction material.

Embodiment 135. The seat track assembly according to embodiment 134, further comprising a support component disposed between the first receiver and at least one of the sliding bars.

Embodiment 136. The seat track assembly according to embodiment 135, wherein the support component is secured to the first receiver.

Embodiment 137. The seat track assembly according to any one of embodiments 135 and 136, wherein the support component is secured to at least one of the sliding bars.

Embodiment 138. The seat track assembly according to any one of embodiments 135-137, wherein the support component is engaged to the sliding bar along a complementary engagement interface.

Embodiment 139. The seat track assembly according to embodiment 138, wherein the complementary engagement interface comprises at tongue and groove interface.

Embodiment 140. The seat track assembly according to any one of embodiments 134-139, wherein the sliding bars comprise a low friction material, such a fluoropolymer, such as a PTFE.

Embodiment 141. The seat track assembly according to any one of the preceding embodiments, wherein the sliding bars further comprise a substrate.

Embodiment 142. The seat track assembly according to embodiment 141, wherein the substrate is disposed within the sliding bar such that the substrate is not exposed along a contact interface formed between the first receiver and the sliding bar.

Embodiment 143. The seat track assembly according to any one of embodiments 141 and 142, wherein the substrate comprises a rigid material, such as a metal, an alloy, or a polymer.

Embodiment 144. The seat track assembly according to any one of embodiments 134-143, wherein the second receiver has a generally ellipsoidal cross section.

Embodiment 145. The seat track assembly according to any one of embodiments 134-144, wherein the second receiver has a generally circular cross section.

Embodiment 146. The seat track assembly according to any one of embodiments 134-145, wherein the first receiver has a generally polygonal cross section.

Embodiment 147. The seat track assembly according to any one of embodiments 133-145, wherein the first receiver has a generally rectangular cross section.

Embodiment 148. The seat track assembly according to any one of embodiments 134-147, wherein the plurality of sliding bars comprises at least 2 sliding bars, such as at least 3 sliding bars, at least 4 sliding bars, at least 5 sliding bars, at least 6 sliding bars, at least 7 sliding bars, at least 8 sliding bars, at least 9 sliding bars, or even at least 10 sliding bars.

Embodiment 149. The seat track assembly according to any one of embodiments 134-148, wherein the plurality of sliding bars comprises no greater than 100 sliding bars, such as no greater than 50 sliding bars, or even no greater than 25 sliding bars.

Embodiment 150. The seat track assembly according to any one of embodiments 134-149, wherein a contact interface formed between at least one of the sliding bars and the second receiver is a line contact.

Embodiment 151. The seat track assembly according to any one of embodiments 134-150, wherein a contact interface formed between at least one of the sliding bars and the second receiver is an area contact.

Embodiment 152. The seat track assembly according to any one of embodiments 134-151, wherein the seat track assembly comprises an upper half and a lower half, and wherein all of the sliding bars are disposed in one of the upper and lower halves.

Embodiment 153. The seat track assembly according to embodiment 152, wherein all of the sliding bars are disposed in the lower half of the seat track assembly.

Embodiment 154. The seat track assembly according to any one of embodiments 134-153, further comprising a plurality of tolerance absorption elements.

Embodiment 155. The seat track assembly according to embodiment 154, wherein at least one of the tolerance absorption elements is attached to the first receiver.

Embodiment 156. The seat track assembly according to any one of embodiments 154 and 155, wherein at least one of the tolerance absorption elements is attached to the second receiver.

Embodiment 157. The seat track assembly according to any one of embodiments 154-156, wherein the seat track assembly comprises an upper half and a lower half, and wherein all of the tolerance absorption elements are disposed in one of the upper and lower halves.

Embodiment 158. The seat track assembly according to embodiment 157, wherein all of the tolerance absorption elements are disposed in the upper half of the seat track assembly.

Embodiment 159. The seat track assembly according to any one of embodiments 134-158, wherein the second receiver further comprises an extension extending from the second receiver along at least a portion of a length thereof.

Embodiment 160. The seat track assembly according to embodiment 159, wherein the extension extends along the entire length of the second receiver.

Embodiment 161. The seat track assembly according to any one of embodiments 159 and 160, wherein the extension of the second receiver extends through a slot of the first receiver, the slot of the first receiver extending along the first receiver along at least a portion of a length thereof.

Embodiment 162. The seat track assembly according to any one of embodiments 159-161, wherein the slot extends along the entire length of the first receiver.

Embodiment 163. The seat track assembly according to any one of embodiments 159-162, wherein the extension extends past an outer surface of the first receiver.

Embodiment 164. The seat track assembly according to any one of embodiments 159-163, wherein the extension is attachable to a seat.

Embodiment 165. The seat track assembly according to any one of embodiments 159-164, wherein the first receiver is attachable to a floor of a vehicle.

Embodiment 166. The seat track assembly according to any one of embodiments 134-165, wherein the second receiver further comprises a low friction sliding surface disposed along the second receiver along at least a portion of a contact interface formed between the second receiver and the sliding bars.

Embodiment 167. The seat track assembly according to embodiment 166, wherein the low friction material of the second receiver comprises a polymer, such as a fluoropolymer, such as a PTFE.

Embodiment 168. A seat track assembly comprising:
a first rail and a second rail spaced apart by a distance and extending parallel with respect to one another, wherein at least one of the first and second rails comprises:
a first receiver;
a second receiver, the first and second receivers longitudinally translatable with respect to each other; and
a sliding member disposed therebetween, wherein the sliding member comprises:
a support member having openings defining a top row and a bottom row;
a plurality of slide pins disposed in the top and bottom rows; and
a structure disposed in the top row.

Embodiment 169. The seat track assembly according to embodiment 168, wherein the structure comprises a low friction material and has an aperture extending at least partially therethrough.

Embodiment 170. The seat track assembly according to embodiment 169, wherein the top row includes at least two slide pins.

Embodiment 171. The seat track assembly according to embodiment 170, wherein the structure is disposed between the slide pins.

Embodiment 172. The seat track assembly according to any one of embodiments 168-171, wherein the bottom row of the support member includes two slide pins.

Embodiment 173. The seat track assembly according to any one of embodiments 168-172, wherein the bottom row of the support member is devoid of structures.

Embodiment 174. The seat track assembly according to any one of embodiments 168-173, wherein a diameter of the structure is greater than a diameter of at least one of the slide pins.

Embodiment 175. The seat track assembly according to any one of embodiments 168-174, wherein a diameter of the structure is greater than a diameter of all of the slide pins.

Embodiment 176. The seat track assembly according to any one of embodiments 174 and 175, wherein the diameter of the structure is at least 1.01 the diameter of the slide pin(s), such as at least 1.02 the diameter, at least 1.03 the diameter, at least 1.04 the diameter, at least 1.05 the diameter, at least 1.1 the diameter, or even at least 1.15 the diameter.

Embodiment 177. The seat track assembly according to any one of embodiments 169-176, further comprising a material disposed in the aperture of the structure.

Embodiment 178. The seat track assembly according to embodiment 177, wherein the material comprises a spring.

Embodiment 179. The seat track assembly according to embodiment 178, wherein the spring provides a spring rate of at least 10 N/mm, such as at least 50 N/mm, at least 100 N/mm, at least 150 N/mm, at least 200 N/mm, at least 250 N/mm, at least 300 N/mm, at least 350 N/mm, or even at least 400 N/mm.

Embodiment 180. The seat track assembly according to any one of embodiments 178 and 179, wherein the spring provides a spring rate of no greater than 600 N/mm, such as no greater than 550 N/mm, no greater than 500 N/mm, or even no greater than 450 N/mm.

Embodiment 181. The seat track assembly according to any one of embodiments 178-180, wherein the spring comprises a spring sheet of material having a generally cylindrical body.

Embodiment 182. The seat track assembly according to embodiment 181, wherein the generally cylindrical body includes a gap extending along at least partially along the axial length of the generally cylindrical body.

Embodiment 183. The seat track assembly according to any one of embodiments 181 and 182, wherein the spring sheet has a thickness of at least 0.2 mm, such as at least 0.3 mm, at least 0.4 mm, or even at least 0.5 mm.

Embodiment 184. The seat track assembly according to any one of embodiments 168-183, wherein the structure has a length, wherein the slide pins each have a length, and wherein the length of the structure is greater than the length of the slide pins.

Embodiment 185. The seat track assembly according to any one of embodiments 168-184, wherein the slide pins each have a radial stiffness, wherein the structure has a radial stiffness, and wherein the radial stiffness of the structure is less than the radial stiffness of the slide pins.

Embodiment 186. The seat track assembly according to any one of embodiments 168-185, wherein the slide pins comprise a substrate, and wherein the substrate comprises a metal.

Embodiment 187. The seat track assembly according to any one of embodiments 168-186, wherein the support member comprises a metal.

Embodiment 188. The seat track assembly according to any one of embodiments 168-187, wherein the slide pins are rotatable within the support member.

Embodiment 189. The seat track assembly according to any one of embodiments 168-188, wherein the structure is rotatable within the support member.

Embodiment 190. The seat track assembly according to any one of embodiments 168-189, wherein the structure has a constant shape as measured along the length thereof.

Embodiment 191. The seat track assembly according to any one of embodiments 168-190, wherein the first and second rails are adapted to coupled with a vehicle seat.

Embodiment 192. The seat track assembly according to any one of embodiments 168-191, wherein the support member does not contact either of the first and second receivers.

Embodiment 193. The seat track assembly according to any one of embodiments 168-192, wherein the plurality of slide pins disposed in the top row comprises at least 2 slide pins, such as at least 3 slide pins, at least 4 slide pins, or even at least 5 slide pins.

Embodiment 194. The seat track assembly according to any one of embodiments 168-193, wherein the plurality of slide pins disposed in the top row comprises no greater than 100 slide pins, such as no greater than 50 slide pins, no greater than 25 slide pins, or even no greater than 10 slide pins.

Embodiment 195. The seat track assembly according to any one of embodiments 168-194, wherein at least one of the slide pins at least partially comprises a Meldin®.

Embodiment 196. The seat track assembly according to any one of embodiments 168-195, wherein the structure has a tapered axial end.

Embodiment 197. The seat track assembly according to embodiment 196, wherein the tapered axial end is adapted to guide the structure into the space between the first and second receivers.

Embodiment 198. A seat track assembly comprising:
a first rail and a second rail spaced apart by a distance and extending parallel with respect to one another, wherein at least one of the first and second rails comprises:
a first receiver;
a second receiver, the first and second receivers longitudinally translatable with respect to each other; and
a sliding member disposed therebetween, wherein the sliding member comprises:
a support member having openings defining a top row and a bottom row;
a plurality of slide pins disposed in the top row;
a structure disposed in the top row between at least two of the slide pins, wherein a diameter of at least one of the slide pins in the top row is less than a diameter of the structure; and
a plurality of slide pins disposed in the bottom row.

Embodiment 199. A seat track assembly comprising:
a first receiver coupled to a seat;
a second receiver coupled to a surface, the first and second receivers being longitudinally translatable with respect to each other; and
a sliding member disposed between the first and second receivers, wherein the sliding member comprises a low friction material including an aperture extending along a longitudinal length of the sliding member.

Embodiment 200. The seat track assembly according to embodiment 199, further comprising a spring disposed within the aperture and adapted to provide an outwardly biasing force against the low friction material, features extending from an inner surface into the aperture, or a combination thereof.

Embodiment 201. A seat track assembly comprising:
a first receiver coupled to a seat;
a second receiver coupled to a surface, the first and second receivers being longitudinally translatable with respect to each other; and
a sliding member disposed between the first and second receivers, wherein the sliding member comprises a substrate having an elongated shape and a low friction material disposed around the substrate.

Embodiment 202. The seat track assembly or sliding member according to embodiment 201, wherein a void is disposed between a portion of the substrate and the low friction material, wherein the void has a first volume, $V_1$, as measured prior to installation in the assembly, and a second volume, $V_2$, as measured after installation, and wherein $V_1$ is greater than $V_2$.

Embodiment 203. The seat track assembly or sliding member according to embodiment 201, wherein at least a portion of at least one of the axial ends of the substrate is exposed.

Embodiment 204. A sliding member for a seat track assembly comprising:
a body comprising a low friction material and an inner surface defining an aperture,
wherein:
a spring is disposed within the aperture and adapted to provide an outwardly biasing force against the low friction material; or
features extend from the inner surface into the aperture; or
a combination thereof.

Embodiment 205. The seat track assembly or sliding member according to any one of embodiments 199 and 204, wherein the aperture extends parallel with a longitudinal axis of the sliding member.

Embodiment 206. The seat track assembly or sliding member according to any one of embodiments 199 and 204, wherein the aperture extends entirely through the sliding member.

Embodiment 207. The seat track assembly or sliding member according to any one of embodiments 199 and 204, wherein the aperture comprises a plurality of apertures each extending through at least a portion of the body.

Embodiment 208. The seat track assembly or sliding member according to any one of embodiments 199 and 204, wherein the aperture is defined by an inner surface, and wherein features extend from the inner surface into the aperture.

Embodiment 209. The seat track assembly or sliding member according to any one of embodiments 199, 201, and 204, wherein a maximum force to affect longitudinal translation of the first and second receivers with respect to each other has a standard deviation of no greater than 10 N at a misalignment specification of 0.6 mm.

Embodiment 210. The seat track assembly or sliding member according to any one of embodiments 199, 201, and 204, further comprising:
a support member having an opening,
wherein the sliding member is disposed in the opening of the support member.

Embodiment 211. The seat track assembly or sliding member according to any one of embodiments 199, 201, and 204, wherein the low friction material comprises a rolled sheet of low friction material.

Embodiment 212. The seat track assembly or sliding member according to embodiment 211, wherein the rolled sheet of low friction material comprises a gap extending along at least a portion of an axial length of the sliding member.

Embodiment 213. The seat track assembly or sliding member according to any one of embodiments 199, 201, and 204, wherein the low friction material comprises a fluoropolymer.

Embodiment 214. A sliding member comprising:
an elongated tube comprising a body including a low friction material, wherein the elongated tube includes an inner surface defining an aperture,
wherein:
a spring is disposed within the aperture and adapted to provide an outwardly biasing force against the low friction material; or
wherein the aperture comprises a plurality of apertures each extending at least partially through the elongated tube; or
a combination thereof.

Embodiment 215. A linear motion assembly comprising:
a first member;
a second member; and
a sliding member disposed between the first and second members,
wherein at least one of the first and second members is adapted to longitudinally translate with respect to the sliding member, wherein the sliding member comprises an elongated tube comprising a body including low friction material, and wherein the elongated tube defines an aperture extending along a longitudinal length thereof.

Embodiment 216. A method of forming a sliding member comprising:
forming an elongated tube comprising a body having a low friction outer surface and an aperture extending at least partially through an axial length of the elongated tube; and
installing a spring within the aperture.

Embodiment 217. The method according to any one of embodiments 214 and 216, wherein the spring is not fixedly attached to the elongated tube.

Embodiment 218. The sliding member, assembly, or method according to any one of embodiments 214-217, wherein the aperture extends along the entire length of the elongated tube.

Embodiment 219. The sliding member, assembly, or method according to any one of embodiments 214 and 216, wherein the aperture comprises a plurality of apertures each extending at least partially into the elongated tube.

Embodiment 220. The sliding member, assembly, or method according to embodiment 219, wherein all of the plurality of apertures have a same shape as one another.

Embodiment 221. The sliding member, assembly, or method according to any one of embodiments 214-216, wherein a portion of the body separates the apertures from one another.

Embodiment 222. A sliding member comprising:
a substrate having an elongated shape; and
a low friction material disposed around the substrate, wherein:
at least one of the axial ends of the substrate is exposed from the low friction material; or
the low friction material comprises a gap extending along at least a portion of an axial length of the sliding member; or
a void is disposed between a portion of the substrate and the low friction material; or
a combination thereof.

Embodiment 223. The sliding member according to embodiment 222, wherein the void has a first volume, $V_1$, as measured prior to installation in an assembly, and a second volume, $V_2$, as measured after installation, and wherein $V_1$ is greater than $V_2$.

Embodiment 224. A linear motion system comprising:
a first member;
a second member; and
the sliding member according to any one of embodiments 222 and 223.

Embodiment 225. A method of forming a sliding member comprising:
providing a substrate having an elongated shape;
providing a sheet comprising a low friction material;
cutting the sheet to form a low friction blank; and
shaping the low friction blank around the substrate.

Embodiment 226. The method according to embodiment 225, further comprising:
affixing circumferentially adjacent sides of the low friction blank together.

Embodiment 227. The sliding member, assembly, or method according to any one of embodiments 222, 223, and 225, wherein the sliding member has a barrel shaped outer surface prior to installation between longitudinally translatable components.

Embodiment 228. The sliding member, assembly, or method according to any one of embodiments 222, 223, and 225, wherein the low friction material is not fixedly attached to the substrate.

EXAMPLES

Figure 16:
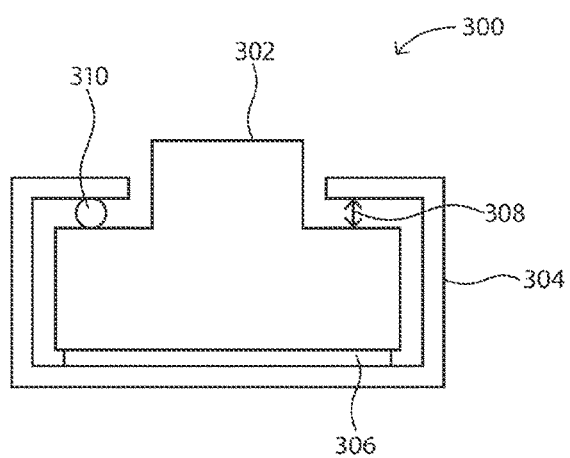
FIG. 16 includes a cross-sectional side elevation view of a test assembly used to test sliding and frictional forces within a seat track assembly.

A test was performed to determine relative sliding forces over a given range of misalignment. A track assembly 300 (FIG. 16) is provided having an inner receiver 302, an outer receiver 304, and a sliding layer 306 disposed therebetween. The sliding layer 306 is disposed below the inner receiver 302 and above the outer receiver 304. The inner receiver 302 has an inverted T-shape formed from steel. The outer receiver 304 has a U-shape with upper flanges extending over the lower portion of the inner receiver 302. The outer receiver 304 is also formed from steel. A gap 308 is formed between the inner and outer receivers 302 and 304.

Two sliding members 310 are inserted into the gap 308 on opposite sides of the inner receiver 302. The sliding members 310 are longitudinally translated into the gap 308 from a terminal axial end of the track assembly 300 and urged continuously until fully positioned between the terminal axial ends of the seat track assembly 300. The sliding member 310 is inserted into the gap 308 in a state of compression, i.e., an initial, undeformed diameter of the sliding member 310 is greater than a diameter of the installed sliding member 310. Pre-compressing the sliding member 310 permits zero clearance testing.

The receivers 302 and 304 are longitudinally translated with respect to one another while the force required to translate the receivers 302 and 304 is measured and recorded. To minimize bending and the occurrence of undesirable transverse forces, the receivers 302 and 304 are measured only from a half-forward to a half-backward position. In the half-forward position, the receiver 302 is pulled such that a first half of the receiver 302 is disposed within the receiver 304 and a second half of the receiver 302 is disposed outside of the receiver 304. The receiver 302 is then translated to a half-backward position where the second half of the receiver 302 is disposed within the receiver 304 and the first half of the receiver 302 is disposed outside of the receiver 304. In this regard, the receivers 302 and 304 translate with respect to each other along a full length of the receiver 302.

The gap 308 in the track assembly 300 has a size, e.g., 6.5 mm. Upon insertion into the gap 308 of the track assembly 300, the sliding member 310 compresses so as to have an outer diameter approximately equal to the size of the gap 308, e.g., 6.5 mm. Testing is performed at that gap size. The gap is then decreased by an incremental distance, e.g., 0.1 mm, and testing is performed at the new gap distance. This process is repeated until a desired misalignment specification is achieved. The "misalignment specification" describes the change in misalignment. For example, testing track assemblies having a gap distance in a range of 5.9 mm and 6.5 mm results in a misalignment specification of 0.6 mm.

Sample 1 includes two sliding members 310 shaped as illustrated in FIG. 3D, each formed from PTFE and having an initial, undeformed outer diameter of 6.7 mm. An aperture extends uniformly through the entire length of each of the sliding members 310 along a central position and has an aperture diameter of 5.9 mm. The wall thickness of the sliding members 310 is 0.4 mm.

Sample 2 is nearly identical to sample 1, except the apertures are filled with a silicon.

Sample 3 includes two sliding member 310 shaped as illustrated in FIG. 3D, each formed from PTFE and having an initial, undeformed outer diameter of 6.7 mm. An aperture extends uniformly through the entire length of each of the sliding members 310 along a central position and has an aperture diameter of 5.7 mm. The wall thickness of the sliding members 310 is 0.5 mm.

Sample 4 is nearly identical to sample 3, except the apertures are filled with a silicon.

The Samples are first inserted into a track assembly having a gap of 6.5 mm. The track assembly 300 is translated to the half-forward position, with the required force to complete the translation measured and recorded. The track assembly 300 is then translated to the half-backward position, with the required force to complete the translation measured and recorded. The sliding members 310 are removed from the gap 308 and the track assembly 300 is adjusted such that the gap 308 is 6.4 mm. Again, the sliding members 310 are positioned within the gap 308 (this time compressing to 6.4 mm) and the force to translate the track assembly 300 to the half-forward and the half-backward positions is measured and recorded. This process is repeated over a range of gap sizes (6.3 mm, 6.2 mm, 6.1 mm, 6.0 mm and 5.9 mm).

Table 1 illustrates the force necessary to translate the track assembly to the half-forward position. Table 2 illustrates the force to translate the track assembly to the half-backward position.

TABLE 1

Force to translate to half-forward position

| Gap size (mm) | Sample 1 (N) | Sample 2 (N) | Sample 3 (N) | Sample 4 (N) |
|---|---|---|---|---|
| 6.5 | 9.0 | 11.3 | 14.3 | 12.0 |
| 6.4 | 4.0 | 12.3 | 14.3 | 17.3 |
| 6.3 | 4.0 | 14.0 | 15.3 | 19.0 |
| 6.2 | 5.0 | 16.7 | 18.3 | 19.7 |
| 6.1 | 6.0 | 18.7 | 19.7 | 21.0 |
| 6.0 | 8.0 | 17.7 | 18.7 | 22.0 |
| 5.9 | 10.0 | 19.3 | 21.3 | 24.3 |
| Standard Deviation | 2.44 | 3.18 | 2.79 | 3.64 |

TABLE 2

Force to translate to half-backward position

| Gap size (mm) | Sample 1 (N) | Sample 2 (N) | Sample 3 (N) | Sample 4 (N) |
|---|---|---|---|---|
| 6.5 | 9.0 | 12.0 | 14.0 | 12.0 |
| 6.4 | 4.0 | 12.7 | 15.3 | 17.3 |
| 6.3 | 4.0 | 14.3 | 15.7 | 18.3 |
| 6.2 | 5.0 | 17.0 | 18.0 | 19.0 |
| 6.1 | 6.0 | 20.3 | 19.0 | 21.0 |
| 6.0 | 8.0 | 18.3 | 19.7 | 23.3 |
| 5.9 | 10.0 | 21.0 | 20.3 | 24.7 |
| Standard Deviation | 2.44 | 3.60 | 2.43 | 4.21 |

The average force necessary to translate the seat track assembly in the forward and backward directions is 14.86 N. As illustrated in Tables 1 and 2, the standard deviation is greatest for Sample 4 (4.21 N standard deviation) at a 0.6 mm misalignment specification. The average standard deviation of the necessary force to translate the seat track assembly using the four samples in both half-forward and half-backward translations is 3.09 N. Accordingly, rails using sliding members in accordance with one or more of the embodiments described herein can achieve a sliding force standard deviation of less than 10 N, such as less than 9 N, less than 8 N, less than 7 N, less than 6 N, less than 5 N, less than 4 N, less than 3 N, or even less than 2.75 N at a seat track misalignment specification of 0.6 mm.

Table 3 illustrates the standard deviation of the Samples at a misalignment specification of 0.5 mm utilizing the data recorded in Tables 1 and 2.

TABLE 3

Standard deviation at a misalignment specification of 0.5 mm

| | Sample 1 (N) | Sample 2 (N) | Sample 3 (N) | Sample 4 (N) |
|---|---|---|---|---|
| Forward | 2.40 | 2.76 | 2.66 | 2.45 |
| Backward | 2.40 | 3.28 | 2.09 | 2.93 |
| Average | 2.40 | 3.02 | 2.38 | 2.69 |

As illustrated in Table 3, the average standard deviation for the Samples at a 0.5 mm misalignment specification is 2.62 N. Accordingly, rails using sliding members in accordance with one or more of the embodiments described herein can achieve a sliding force standard deviation of less than 10 N, such as less than 9 N, less than 8 N, less than 7 N, less than 6 N, less than 5 N, less than 4 N, less than 3 N, or even less than 2.75 N at a seat track misalignment specification of 0.5 mm.

A further test was conducted to determine the break-in period, or the number of cycles necessary post-assembly after which the sliding forces of the rails remains relatively constant. To test the break-in period, various sliding member configurations are positioned within a seat track assembly and the receivers of the seat track assembly are translated between forward (F) and backward (B) positions with respect to one another. One of the receivers is held in place and the other receiver is translated with respect thereto. The force necessary to translate the receivers apart in a first direction is measured and recorded. The force necessary to translate the receivers apart in a second, opposite, direction is measured and recorded. Completion of one cycle occurs upon return to the initial position of the receivers with respect to one another. Repeated cycling is performed, e.g., 105 cycles are performed for each of the various sliding member configurations.

Sample 1 is a track assembly including a traditional ball bearing assembly having slightly oversized steel ball bearings and utilizing a lubricant to facilitate reduced frictional resistance.

Sample 2 is a track assembly including a structure in accordance with an embodiment described herein.

Sample 3 is a track assembly including a slide pin in accordance with an embodiment described herein.

Sample 4 is a track assembly including a strip having ellipsoidal end portions in accordance with an embodiment described herein.

Sample 5 includes an outer receiver, an inner receiver inscribed within the outer receiver, and sliding bars disposed therebetween.

0% change in force, all as measured over the same number of cycles. Thus, Samples 2, 3, 4 and 5 all have reduced break in periods as compared to traditional assemblies utilizing oversized ball bearings.

It is noted that during testing, Sample 1 exhibited outer coating peel, where the outer coating of the ball bearings wore and broke off from the underlying steel. Displaced fragments of outer coating contaminated the track assembly, resulting in buildup of particles. Additionally, Sample 1 resulted in greater burnishing of the track assembly as compared to the other tested Samples.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single

TABLE 4

Break-in Period

| Cycle Number | Sample 1 (N) | | Sample 2 (N) | | Sample 3 (N) | | Sample 4 (N) | | Sample 5 (N) | |
|---|---|---|---|---|---|---|---|---|---|---|
| | F | B | F | B | F | B | F | B | F | B |
| 1 | 56 | 51 | 42 | 40 | 33 | 28 | 20 | 20 | 66 | 66 |
| 2 | 49 | 48 | 39 | 43 | 31 | 30 | 21 | 21 | 62 | 66 |
| 3 | 74 | 76 | 42 | 44 | 34 | 34 | 22 | 22 | 67 | 70 |
| 4 | 69 | 52 | 43 | 39 | 36 | 37 | 22 | 22 | 73 | 67 |
| 5 | 70 | 48 | 41 | 44 | 33 | 34 | 23 | 23 | 72 | 67 |
| 101 | 37 | 26 | 40 | 42 | 26 | 26 | 27 | 28 | 67 | 60 |
| 102 | 35 | 31 | 45 | 41 | 26 | 25 | 29 | 29 | 71 | 66 |
| 103 | 30 | 32 | 42 | 43 | 24 | 24 | 28 | 29 | 70 | 68 |
| 104 | 48 | 24 | 41 | 43 | 38 | 27 | 26 | 28 | 70 | 69 |
| 105 | 43 | 28 | 45 | 45 | 27 | 25 | 29 | 31 | 68 | 69 |
| Avg. Force (Cycles 1-5) | 59 | | 42 | | 33 | | 22 | | 68 | |
| Avg. Force (Cycles 101-105) | 33 | | 43 | | 27 | | 28 | | 68 | |
| Δ Force (Cycles 1-5 to Cycles 101-105) | 26 | | 1 | | 6 | | 7 | | 0 | |

As illustrated in Table 4, Sample 1 exhibits a 44% change in force between cycles 1 to 5 and cycles 101 to 105. By comparison, Sample 2 exhibits a 2.3% change in force, Sample 3 exhibits a 18.2% change in force, Sample 4 exhibits a 21.4% change in force, and Sample 5 exhibits a embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

The invention claimed is:

1. A linear motion assembly comprising:
a seat track assembly comprising:
sliding member comprising:
an elongated tube comprising a body including a low friction material comprising a fluoropolymer, wherein the elongated tube includes an inner surface defining an aperture having a uniform profile as measured along a length of the elongated tube, wherein the aperture extends parallel with a longitudinal axis of the sliding member,
wherein at least one of:
   a) a spring is disposed within the aperture and adapted to provide an outwardly biasing force against the low friction material,
   b) the aperture comprises a plurality of apertures each extending at least partially through the elongated tube,
   c) a substrate positioned along an outer perimeter of the aperture, or
   d) a combination thereof.

2. The sliding member according to claim 1, wherein the sliding member is adapted to be disposed between a first member and a second member, and wherein at least one of the first and second members is adapted to longitudinally translate with respect to the sliding member.

3. The sliding member according to claim 1, wherein:
at least one axial end of the substrate is exposed from the low friction material; or
the low friction material comprises a gap extending along at least a portion of an axial length of the sliding member; or
a void is disposed between a portion of the substrate and the low friction material; or a combination thereof.

4. The sliding member according to claim 1, wherein the low friction material comprises a rolled sheet of low friction material.

5. The sliding member according to claim 1, wherein the aperture extends along the entire length of the elongated tube.

6. The sliding member according to claim 1, further comprising:
a support member having an opening,
wherein the sliding member is disposed in the opening of the support member.

7. The seat track assembly according to claim 1, wherein the aperture has a polygonal cross section.

8. A linear motion assembly comprising:
a seat track assembly comprising:
a first member;
a second member, and
a sliding member disposed between the first and second members,
wherein at least one of the first and second members is adapted to longitudinally translate with respect to the sliding member, and wherein the sliding member comprises:
an elongated tube comprising a body including a low friction material comprising a fluoropolymer, wherein the elongated tube includes an inner surface defining an aperture, wherein the aperture extends parallel with a longitudinal axis of the slid in a member,
wherein at least one of:
   a) a spring is disposed within the aperture and adapted to provide an outwardly biasing force against the low friction material,
   b) the aperture comprises a plurality of apertures each extending at least partially through the elongated tube,
   c) a substrate positioned along an outer perimeter of the aperture, or
   d) a combination thereof.

9. The linear motion assembly according to claim 8, wherein the aperture extends along the entire length of the elongated tube.

10. The linear motion assembly according to claim 8, wherein all of the plurality of apertures have a same shape as one another.

11. A seat track assembly comprising:
a first receiver adapted to be coupled to a seat;
a second receiver adapted to be coupled to a surface, the first and second receivers being longitudinally translatable with respect to each other, and
a sliding member disposed between the first and second receivers, wherein the sliding member comprises:
an elongated tube comprising a body including a low friction material comprising a fluoropolymer, wherein the elongated tube includes an inner surface defining an aperture,
wherein at least one of:
   a) a spring is disposed within the aperture and adapted to provide an outwardly biasing force against the low friction material,
   b) the aperture comprises a plurality of apertures each extending at least partially through the elongated tube,
   c) a substrate positioned along an outer perimeter of the aperture, or
   d) a combination thereof.

12. The seat track assembly according to claim 11, wherein at least a portion of at least one of a pair of axial ends of the substrate is exposed.

13. The seat track assembly according to claim 11, wherein a maximum force to affect longitudinal translation of the first and second receivers with respect to each other has a standard deviation of no greater than 30 N at a misalignment specification of 0.6 mm.

14. The seat track assembly according to claim 11, further comprising:
a support member having an opening,
wherein the sliding member is disposed in the opening of the support member.

15. The seat track assembly according to claim 11, wherein the low friction material comprises a rolled sheet of low friction material.

16. The seat track assembly according to claim 15, wherein the rolled sheet of low friction material comprises a gap extending along at least a portion of an axial length of the sliding member.

* * * * *

UNITED STATES PATENT AND TRADEMARK OFFICE
CERTIFICATE OF CORRECTION

| | |
|---|---|
| PATENT NO. | : 10,518,666 B2 |
| APPLICATION NO. | : 14/882676 |
| DATED | : December 31, 2019 |
| INVENTOR(S) | : Timothy J. Hagan et al. |

It is certified that error appears in the above-identified patent and that said Letters Patent is hereby corrected as shown below:

In the Claims

Column 44, Line 5, please delete "slid in a member" and insert --sliding member--.

Signed and Sealed this
Twenty-first Day of February, 2023

Katherine Kelly Vidal
*Director of the United States Patent and Trademark Office*